United States Patent
Kuga

(10) Patent No.: US 9,111,354 B2
(45) Date of Patent: Aug. 18, 2015

(54) IMAGE PROCESSING METHOD AND IMAGE PROCESSING APPARATUS

(71) Applicant: CANON KABUSHIKI KAISHA, Tokyo (JP)

(72) Inventor: Takeshi Kuga, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 76 days.

(21) Appl. No.: 13/908,297

(22) Filed: Jun. 3, 2013

(65) Prior Publication Data
US 2013/0322775 A1    Dec. 5, 2013

(30) Foreign Application Priority Data
Jun. 5, 2012 (JP) ................. 2012-128132

(51) Int. Cl.
*G06K 9/36* (2006.01)
*G06T 9/00* (2006.01)

(52) U.S. Cl.
CPC ...................................... *G06T 9/008* (2013.01)

(58) Field of Classification Search
CPC ..... G06K 9/38; H04N 1/4052; H04N 1/4053; H04N 1/46; H04N 1/52; H04N 1/64
See application file for complete search history.

(56) References Cited

U.S. PATENT DOCUMENTS

| | | | |
|---|---|---|---|
| 6,342,950 B1* | 1/2002 | Tabata et al. | 358/1.6 |
| 7,474,442 B2* | 1/2009 | Dang | 358/3.03 |
| 7,551,323 B2* | 6/2009 | Bailey et al. | 358/3.03 |
| 8,169,664 B2* | 5/2012 | Kawamura | 358/3.03 |
| 8,520,948 B2* | 8/2013 | Ito | 382/178 |
| 8,670,629 B2* | 3/2014 | Ashida | 382/252 |

FOREIGN PATENT DOCUMENTS

JP    2010-050846 A    3/2010

* cited by examiner

*Primary Examiner* — Jose Couso
(74) *Attorney, Agent, or Firm* — Canon USA, Inc. IP Division

(57) ABSTRACT

An image processing apparatus includes a first error diffusion unit, a second error diffusion unit, and a first determining unit, wherein the second error diffusion unit performs error diffusion processing in parallel with the first error diffusion unit and has an operating unit and a calculation unit, and the first determining unit determines whether quantized data for the second pixel of interest is fixed by the second error diffusion unit on the basis of whether the total of value is equal to or lower than a first reference value and whether the total of value is equal to or higher than a second reference value that is higher than the first reference value.

6 Claims, 15 Drawing Sheets

SUM OF ERROR DATA E(k, m)
= E(k, m−1)∗α + E(k−1, m−1)∗β + E(k−1, m)∗γ
+ E(k−1, m+1)∗δ

α = 7/16, β = 1/16, γ = 5/16, δ = 3/16

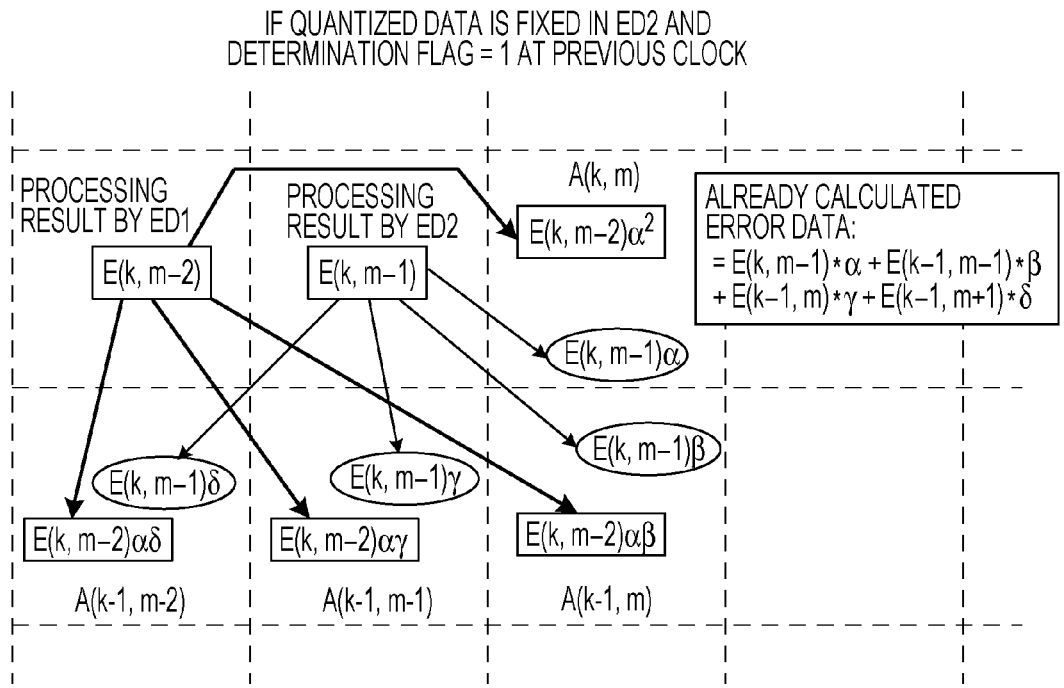
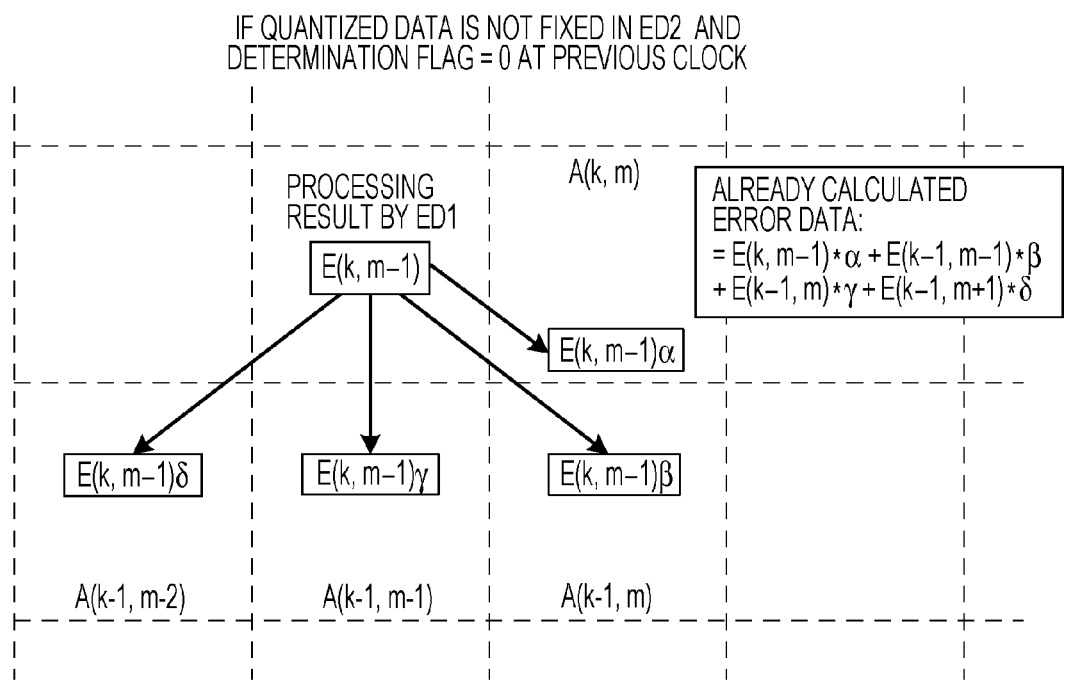

IMAGE PROCESSING METHOD AND IMAGE PROCESSING APPARATUS

BACKGROUND OF THE INVENTION

1. Field of the Invention

One disclosed aspect of the embodiments relates to image processing methods and image processing apparatuses which may quantize input image data by an error diffusion method.

2. Description of the Related Art

In the past, quantization processing by an error diffusion method may diffuse an error caused by quantization of each pixel to a predetermined pixel in accordance with a two-dimensional error matrix, for example. An adjacent pixel to be processed on a same line is quantized by adding the error diffused to the original pixel value. After the pixels for one line have completely been quantized, pixels for one adjacent line are quantized in the same manner. Thus, all lines contained in image data are sequentially quantized.

Quantization processing by an error diffusion method is required to sequentially quantize pixel by pixel because a processing result from an immediately preceding pixel is used to process a pixel of interest, as described above. In other words, higher-speed quantization processing is difficult to achieve.

Accordingly, a method for achieving higher speed image processing by an error diffusion method has been proposed which processes two pixels simultaneously at one clock (see Japanese Patent Laid-Open No. 2010-050846).

However, according to the image processing method disclosed in Japanese Patent Laid-Open No. 2010-050846, it is unable to diffuse an error value of one pixel of four pixels to a close pixel. For that reason, the error data of the pixel may be diffused to a pixel away from the proper pixel. Diffusion of error data to a pixel away from a proper pixel may generate discontinuous fine lines and/or reduce the sharpness of an image part which should be highly sharp. In this way, a part of an algorithm of an error diffusion method in the past is changed at the expense image quality in order to increase the speed of image processing by the error diffusion method.

SUMMARY OF THE INVENTION

According to one aspect of the embodiments, there is provided an image processing apparatus and image processing method which may solve a problem in related arts.

According to another aspect, there is provided an image processing apparatus and image processing method which achieves higher-speed image processing by an error diffusion method without losing effects by the error diffusion method.

An image processing apparatus according to one embodiment includes a first error diffusion unit which performs error diffusion processing on a predetermined first pixel of interest in image data, a second error diffusion unit which performs error diffusion processing on a second pixel of interest that is on a same line as that of the first pixel of interest and is next to the first pixel of interest, and a first determining unit which determines whether quantized data for the second pixel of interest is fixed by error diffusion processing by the second error diffusion unit or not, wherein the second error diffusion unit performs error diffusion processing in parallel with the first error diffusion unit and has an operating unit which calculates a total of values of input image data of the second pixel of interest and error data to be diffused from a pixel excluding the first pixel of interest, and a calculation unit which calculates quantized data and an error value if the first determining unit determines that the quantized data is fixed, and the first determining unit determines whether quantized data for the second pixel of interest is fixed by the second error diffusion unit or not on the basis of whether the total of value is equal to or lower than a first reference value or not and whether the total of value is equal to or higher than a second reference value that is higher than the first reference value or not.

Further features of the disclosure will become apparent from the following description of exemplary embodiments with reference to the attached drawings.

BRIEF DESCRIPTION OF THE DRAWINGS

FIGS. 10A and 10B are explanatory diagram of an error data addition method according to the first embodiment.

DESCRIPTION OF THE EMBODIMENTS

One disclosed feature of the embodiments may be described as a process which is usually depicted as a flowchart, a flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

One disclosed feature of the embodiments may be described as a process which is usually depicted as a timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

Figure 1:
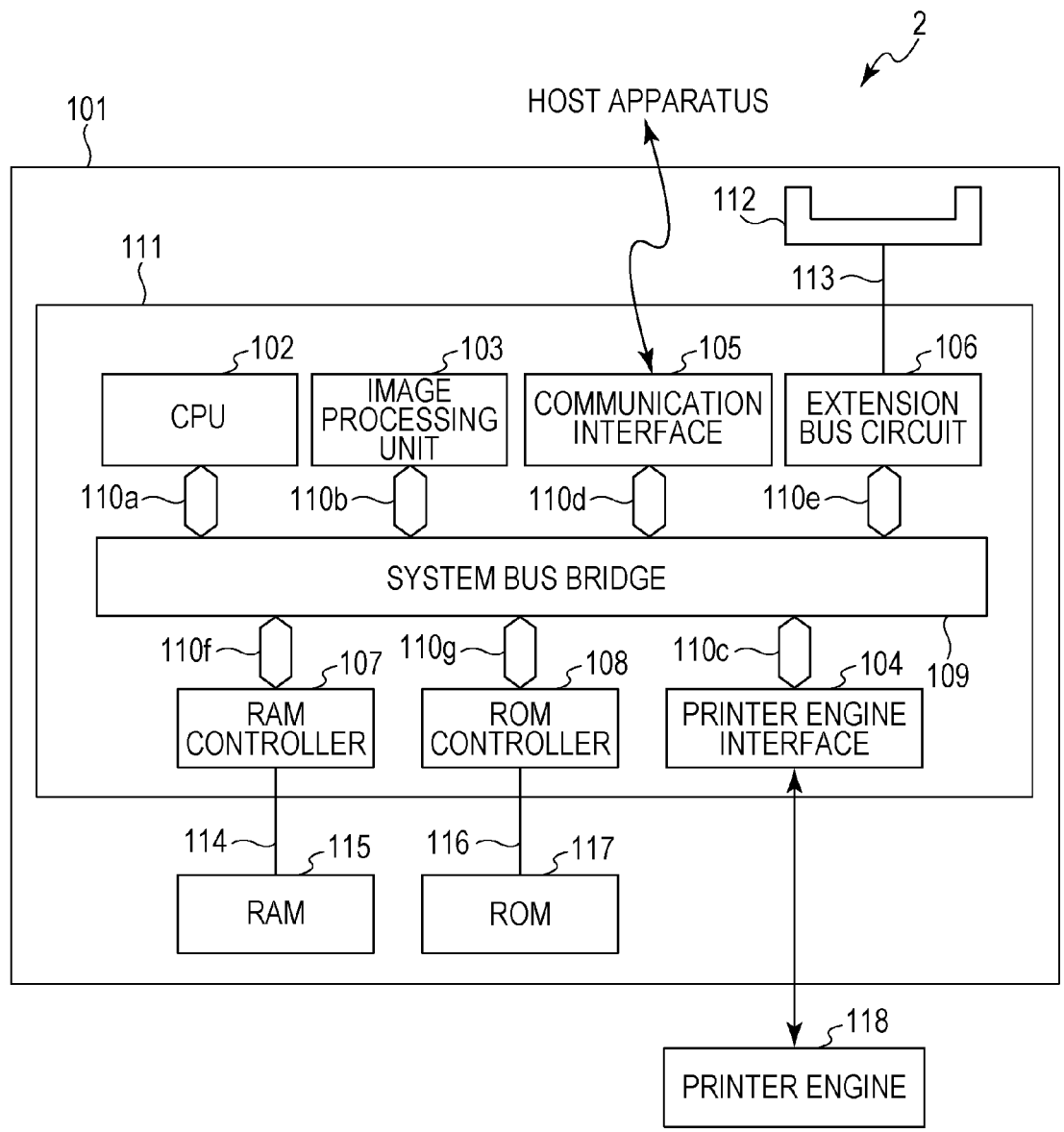
FIG. 1 is a functional block diagram illustrating a configuration of an ink-jet recording apparatus.

FIG. 1 is a block diagram illustrating a configuration of a recording apparatus that is an exemplary embodiment. As illustrated in FIG. 1, a recording apparatus 2 includes an image formation controller 101 and a printer engine 118.

The image formation controller 101 receives a print instruction and image data to be printed from a host apparatus such as a personal computer, converts the received image data to bi-level image data supported by the printer engine 118 and outputs it. The image formation controller 101 includes a CPU 102, an image processing unit 103, a printer engine interface 104, a communication interface 105, an extension bus circuit 106, a RAM controller 107, and a ROM controller 108. These blocks are connected to a system bus bridge 109 through bus lines 110a to 110g. According to this embodiment, these blocks are implemented as an ASIC 111 sealed in one package as a system LSI. The image formation controller 101 further includes an expansion slot 112 to which a function extension unit is mounted, a RAM 115 and a ROM 117.

The CPU 102 is responsible for general control over the image formation controller 101. The CPU 102 reads a control program stored in the ROM 117, loads it to and executes it in the RAM 115 and controls the image processing unit 103 for converting image data received from a host apparatus to image formation data that are bi-level image data. The CPU 102 may control a communication interface 105 for communicating with a host apparatus and may further interpret a communication protocol and control a printer engine interface 104 for transferring image formation data generated by the image processing unit 103 to the printer engine 118.

The image processing unit 103 is capable of converting image data received from a host apparatus to bi-level image data for each one pixel used in processing of causing the printer engine 118 to print the image. A detail configuration of the image processing unit 103 will be described below with reference to drawings.

The printer engine interface 104 is used for transmission and reception between the image formation controller 101 and the printer engine 118. The printer engine interface 104 has a DMAC (direct memory access controller). The printer engine interface 104 sequentially reads bi-level image data generated by the image processing unit 103 and stored in the RAM 115 and transfers them to the printer engine 118 through the RAM controller 107.

The communication interface 105 transmits and receives data to and from a host apparatus such as personal computer or a workstation and stores image data received from a host apparatus to the RAM 115 through the RAM controller 107. The communication interface 105 supports a wired communication protocol or a wireless communication protocol.

The extension bus circuit 106 is capable of controlling a function extension unit mounted to the expansion slot 112 and performs control over transmission of data to the function extension unit through the extension bus 113 and control over reception of data output by the function extension unit. To the expansion slot 112, a communication unit which provides a communication function, a hard disk drive which provides a large-capacity storage function and so on may be mounted. The image processing unit 103, communication interface 105, and extension bus circuit 106 also have a DMAC, like the printer engine interface 104 and are capable of issuing a memory access request.

The RAM controller 107 is capable of controlling the RAM 115 connected to the ASIC 111 through the RAM bus 114. The RAM controller 107 relays data to be written or read between the CPU 102, a component having a DMAC, and the RAM 115. The RAM controller 107 generates a necessary control signal according to a read request from the CPU 102 or a write request from each block and implements a writing operation to the RAM 115 or a reading operation from the RAM 115.

The ROM controller 108 is capable of controlling the ROM 117 connected to the ASIC 111 through a ROM bus 116. The ROM controller 108 generates a necessary control signal according to a read request from the CPU 102, reads a program and/or data prestored in the ROM 117 and returns their content to the CPU 102 through the system bus bridge 109. When the ROM 117 is an electrically rewritable device such as a flash memory, the ROM controller 108 is capable of generating a necessary control signal and rewrites content in the ROM 117.

The system bus bridge 109 is capable of connecting between components in the ASIC 111 and is further capable of arbitrating a bus right when a plurality of blocks issue access requests simultaneously. The CPU 102 and blocks having a DMAC may issue access request substantially simultaneously to the RAM 115 through the RAM controller 107. In this case, the system bus bridge 109 properly arbitrates them in accordance with predetermined priority levels.

The RAM 115 may be a synchronized DRAM, for example, and may be capable of temporarily storing a program to be executed by the CPU 102, temporarily storing image formation data generated by the image processing unit 103, and being used as a work memory for the CPU 102, for example. The RAM 115 may be capable of temporarily buffering image data received by the communication interface 105 from a host apparatus and/or temporarily saving data to be received or transmitted from or to a function extension unit connected through the extension bus 113.

The ROM 117 may be a flash memory, for example, and store a program to be executed by the CPU 102 and/or a parameter necessary for printer control. A flash memory is electrically-rewritable, non-volatile device, and a program and/or a parameter therein may be rewritten by following a predetermined sequence.

Each of the circuit blocks has a register for setting an operation mode, for example. The CPU 102 may set an operation mode for each of the circuit blocks through a register access bus.

The printer engine 118 is a printing mechanism which causes a recording head to print an image on a recording medium on the basis of bi-level image data transmitted from the image formation controller 101. According to this embodiment, the printer engine 118 performs ink-jet recording. In other words, a recording head is caused to eject inks for four colors of cyan (C), magenta (M), yellow (Y), and black (K) to a recording medium on the basis of bi-level image data to record the image.

Figure 2:
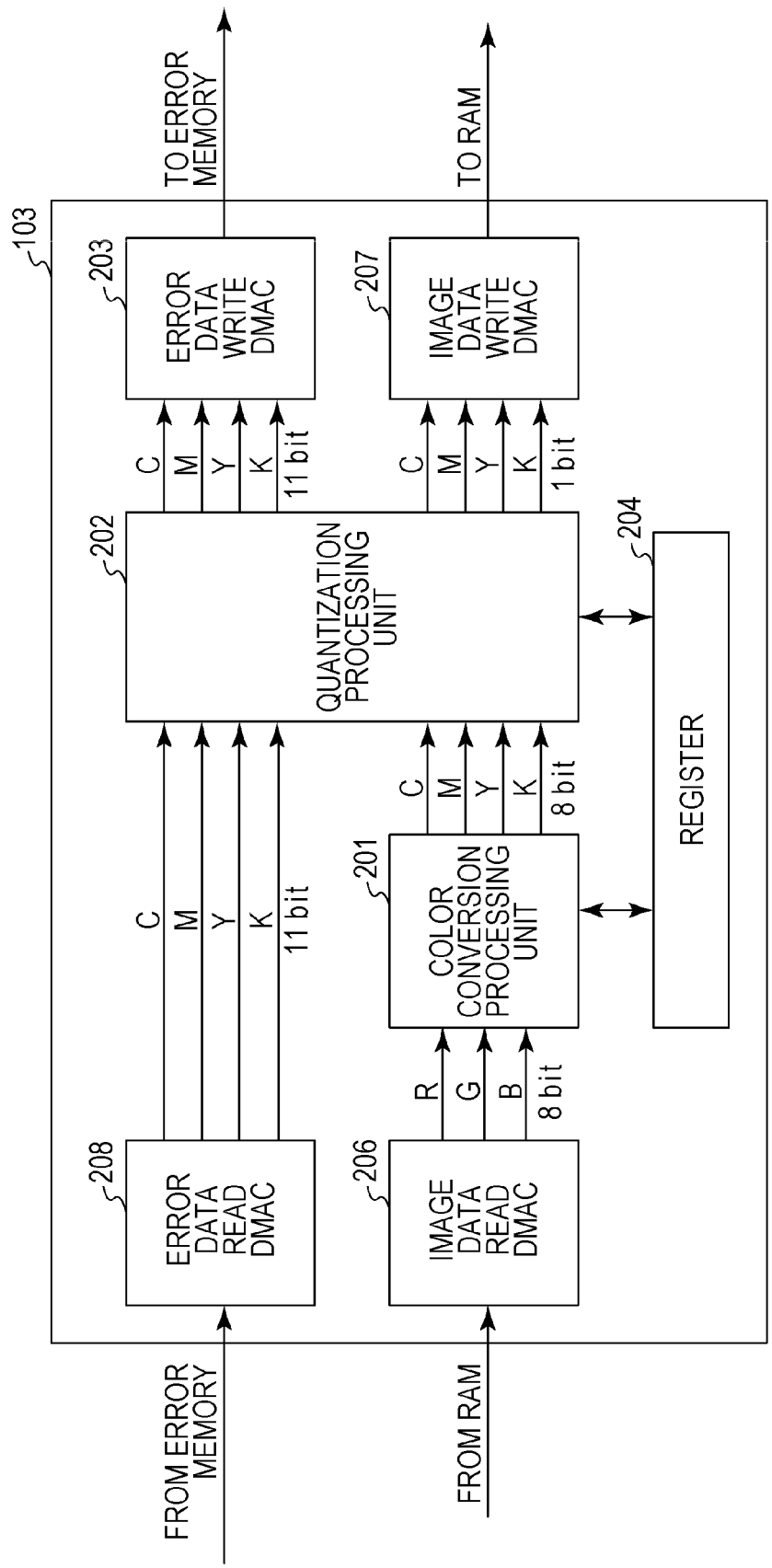
FIG. 2 is a functional block diagram illustrating a configuration of an image processing unit.

Next, the image processing unit 103 in the recording apparatus 2 will be described with reference to drawings. FIG. 2 is a functional block diagram illustrating a detailed configuration of the image processing unit 103.

The image processing unit 103 includes a color conversion processing unit 201, a quantization processing unit 202, a register 204, an image data read DMAC 206, an image data write DMAC 207, an error data read DMAC 208, and an error data write DMAC 203.

The color conversion processing unit 201 converts a color space of multi-level (M-level) input image data for one pixel in a line format received from a host apparatus to a color space reproduced with ink color in the printer engine 118. According to this embodiment, multi-level image data from a host apparatus are 8-bit (256-level) color image data in which pixels are represented by red (R), green (G), and blue (B). The color conversion processing unit 201 converts pixels of the input image data to an 8-bit (0 to 255) color space represented by C, M, Y, and K ink colors in the printer engine 118. The color conversion processing unit 201 may further perform gamma correction according to an output characteristic of the printer engine 118.

The quantization processing unit 202 performs bi-level (N-level) conversion processing by an error diffusion method on each color component. The quantization processing unit 202 adds an error diffused from a surrounding pixel to a pixel of interest and compares the pixel value to which the error has been added with a threshold value for quantization processing such as bi-level conversion processing. If a pixel value after an error is added thereto is higher than the threshold value, the pixel value is 1 (indicating that the dot is to be turned on). If it is not higher than the threshold value, it is zero (indicating that the dot is turned off). A quantization error (a difference from 0 or 255) is diffused to a surrounding unprocessed pixel, and the density of the image data is saved as a whole. The error data is transmitted to the DMAC 203, is stored in an error memory, and is transferred to the quantization processing unit 202 through the DMAC 208.

The register 204 has a register group including an image processing start register to instruct starting image processing and a command/parameter register to designate a detail and/or a parameter of image processing. The register 204 further has a register to set a parameter relating to a quantization threshold value.

The DMAC 206 is a DMAC for reading input image data stored in the RAM 115. The DMAC 207 is a DMAC for storing bi-level image data generated by performing quantization processing on input image data to the RAM 115.

The DMAC 208 is a DMAC for reading from an error memory error data diffused from an adjacent line. The DMAC 203 is a DMAC for storing in an error memory error data to be diffused to an adjacent line. According to this embodiment, an error memory in this case is configured as a part of the RAM 115.

Figure 3:
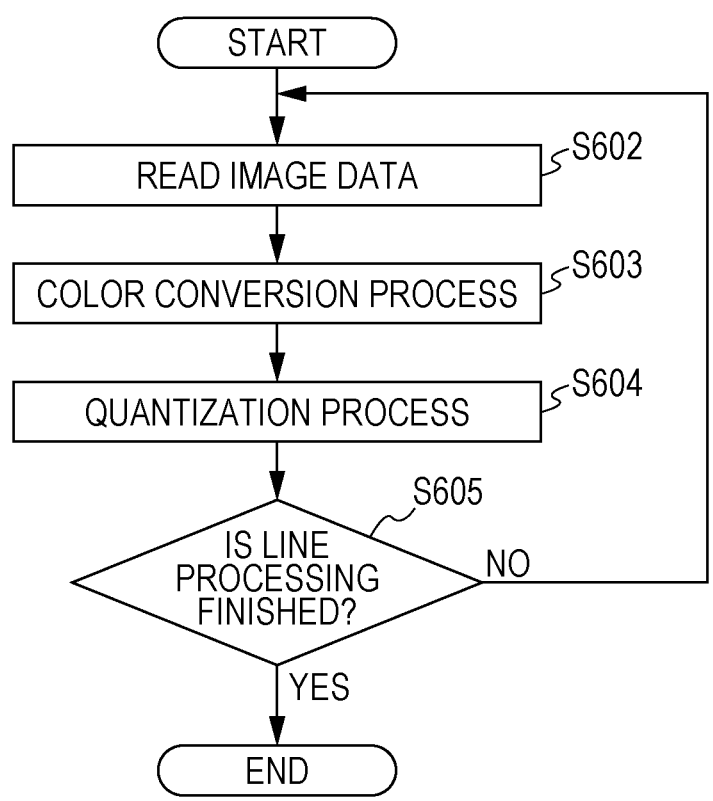
FIG. 3 is a flowchart illustrating an outline of image data processing.

Operations of a recording apparatus according to this embodiment will be described below. FIG. 3 is a flowchart describing an operating routine of an image processing unit for performing quantization processing on image data by the recording apparatus. The image processing unit 103 in response to an instruction to execute quantization processing executes an image processing operation according to the flowchart illustrated in FIG. 3 for the quantization processing.

In step 602, the image processing unit 103 reads image data of a pixel of interest from the RAM 115 through the DMAC 206.

Next, in step 603, the image processing unit 103 converts the pixel of interest to image data represented by ink color by the color conversion processing unit 201.

In step 604, the quantization processing unit 202 in the image processing unit 103 quantizes the image data of the pixel of interest for each of C, M, Y, and K color components by an error diffusion method. Details of the processing by the quantization processing unit in this step will be described below with reference to drawings.

In step 605, the image processing unit 103 determines whether image processing for one line has been finished or not. If any unprocessed pixel remains, the processing returns to step 601. If processing on all pixels on the one line has been finished, the processing ends.

With reference to FIGS. 4 to 12, details of operations of the quantization processing unit 202 in image processing unit 103 will be described.

Figure 4:
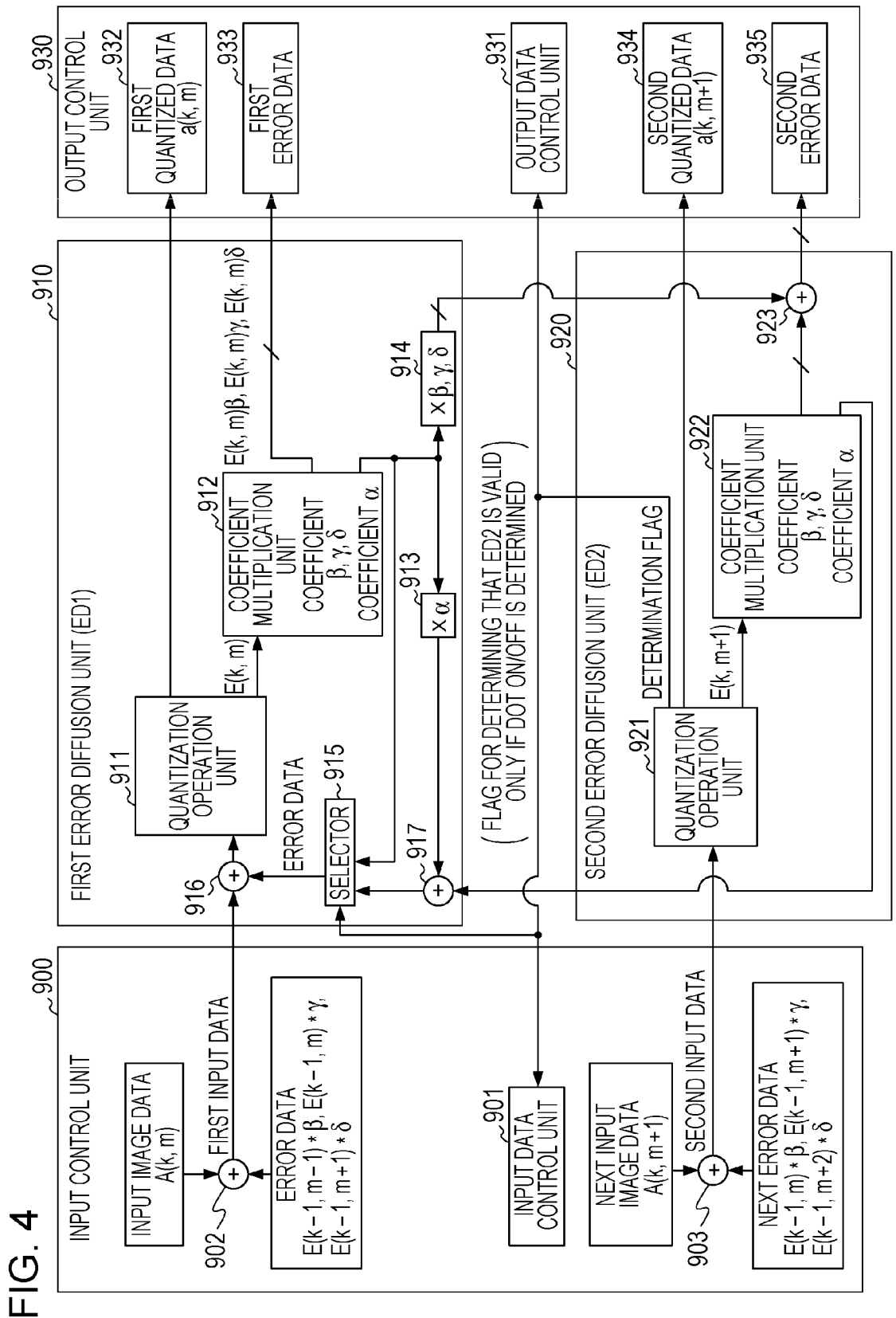
FIG. 4 is a block diagram illustrating a configuration of a quantization processing unit according to a first embodiment.

As illustrated in FIG. 4, the quantization processing unit 202 includes an input control unit 900, a first error diffusion unit (ED1) 910, a second error diffusion unit (ED2) 920, and an output control unit 930. The first error diffusion unit 910 and second error diffusion unit 920 operate in parallel, the details of which will be described below.

The input control unit 900 reads and adds error data diffused from a previous line to image data of a pixel of interest output from the color conversion processing unit 201 and transmits input data to the error diffusion units. The error data to be diffused from a previous line are stored in the RAM 115.

When the first error diffusion unit 910 receives input image data and error data from a previous line, the first error diffusion unit 910 adds error data from a processed pixel on the same line to them, compares it with a threshold value for each of the color components for quantization and outputs the quantized data and error data. On the other hand, when the second error diffusion unit 920 receives input image data and error data from a previous line, the second error diffusion unit 920 compares them with a threshold value for each of the color components for quantization and outputs the quantized data and error data.

The output control unit 930 then stores the quantized data and error data output from the first error diffusion unit 910 to the RAM 115 through the DMAC 207. The output control unit 930 controls whether quantized data and error data output from the second error diffusion unit 920 is to be stored to the RAM 115 or not in accordance with a determination flag, which will be described below.

When the image processing unit 103 is instructed to start image processing by writing from the CPU 102 to the register 204, the image processing unit 103 sequentially reads image data stored in the RAM 115 from a pixel at one end to a pixel at the other end and performs the color conversion processing and quantization image processing thereon. After the line processing ends, the image processing unit 103 notifies the CPU 102 of the completion of the processing by issuing an interrupt. Performing processing on pixel lines that are adjacent to each other in a direction of sub scan in response to an instruction from the CPU 102 may achieve bi-level conversion processing on the entire image data. The bi-level converted output image data are sequentially stored in the RAM 115. They are transmitted to the printer engine 118 through the printer engine interface 104 to record on a recording medium.

Figure 5A:
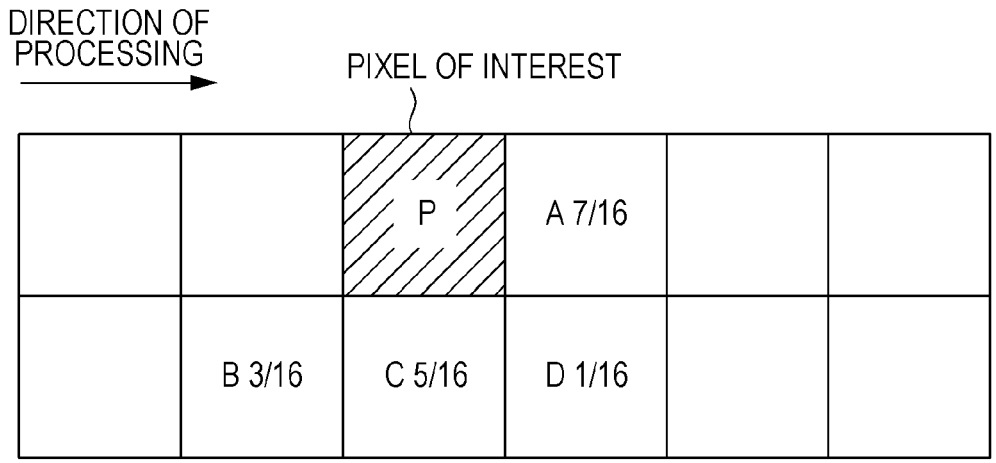
FIGS. 5A, 5B, and 5C are explanatory diagrams of an error diffusion method by a quantization operating unit according to the first embodiment.
Figure 5B:
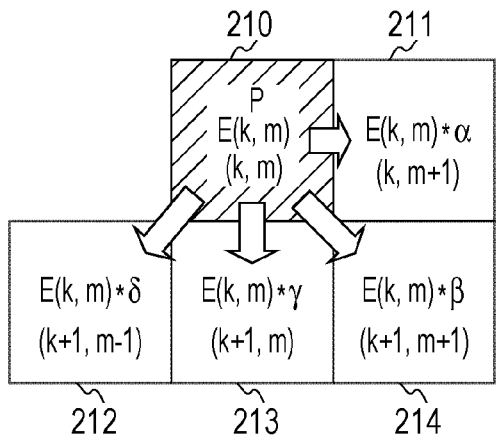

Here, an error diffusion method by the first error diffusion unit 910 and an error diffusion method by the second error diffusion unit 920 according to this embodiment will be described. FIGS. 5A and 5B are diagrams for explaining an error diffusion method by the first error diffusion unit 910 and an error diffusion method by the second error diffusion unit 920 according to this embodiment. According to this embodiment, an error diffusion method by Floyd & Steinberg is applied.

In FIG. 5A, a pixel indicated by letter "P" is a pixel of interest. A quantization error caused by quantization processing is diffused to an unprocessed surrounding pixel in accordance with a diffusion coefficient illustrated in FIG. 5A. Error data indicated by letter "A" in FIG. 5A to be diffused to a same line is saved in a buffer in an error diffusion unit within the quantization processing unit 202. The error data to be diffuse to adjacent lines indicated by letters "B", "C" and "D" illustrated in FIG. 5A are once stored in a buffer in an error diffusion unit within the quantization processing unit 202, and all error data to be diffused to one pixel are added. The added error data are transmitted to the output control unit 930 and are stored in the RAM 115 through the error data write DMAC 203.

Figure 5C:
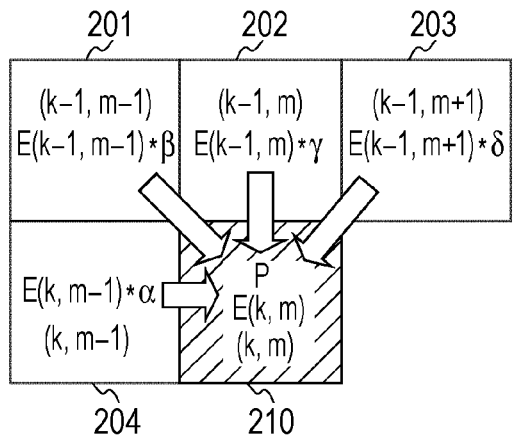

FIG. 5B schematically illustrates how error data is diffused from viewpoint of a pixel subject to the diffusion of the error value. FIG. 5C schematically illustrates how error data is diffused from viewpoint of a pixel subject to the diffuse of the error data. In FIGS. 5B and 5C, a longitudinal coordinate is k, a lateral coordinate is m, coordinates of a pixel of interest P is (k, m), and an error value to be diffused from a pixel of interest P to a surrounding pixel is E(k, m).

As illustrated in FIG. 5B, according to a Floyd & Steinberg error diffusion method, $E(k, m) \times \alpha$ is diffused from a pixel of interest P200 to a pixel on a same line that is a pixel 211 at coordinates (k, m+1). $E(k, m) \times \beta$ is diffused from the pixel of interest P200 to a pixel 214 at coordinates (k+1, m+1). In the same manner, $E(k, m) \times \gamma$ is diffused from the pixel of interest P200 to a pixel 213 at coordinates (k+1, m), and $E(k, m) \times \delta$ is diffused from the pixel of interest P200 to a pixel 212 at coordinates (k+1, m−1). Thus, the image data at (k, m+1) has a value resulting from addition of $E(k, m) \times \alpha$ to original image data. In the same manner, each of image data at (k+1, m−1), image data at (k+1, m), and image data at (k+1, m+1) has a value resulting from addition of predetermined error data to original image data. The processing as described above is performed on subject pixels sequentially. The density of an image as a whole is maintained such that the total sum $(\alpha+\beta+\gamma+\delta)$ of proportions of diffusion coefficients of error data can be equal to 1. According to this embodiment, $\alpha=7/16$, $\beta=1/16$, $\gamma=5/16$, and $\delta=3/16$. In other words, a value acquired by multiplying an error value E(k, m) by $7/16$ is added to the pixel 211 at the coordinates (k, m+1) on a same line. Error data acquired by multiplying an error value by $1/16$ is added to the pixel 214 at the coordinates (k+1, m+1) on an adjacent line. Error data acquired by multiplying an error value by $5/16$ is added to the pixel 213 at the coordinates (k+1, m), and error data acquired by multiplying an error value by $3/16$ is added to the pixel 212 at the coordinates (k+1, m−1).

On the other hand, as illustrated in FIG. 5C, an error to be diffused to the pixel of interest P200 is a sum of the next four error data. More specifically, error data $E(k−1, m−1) \times \beta$ from the pixel 201 at the coordinates (k−1, m−1), error data $\times \gamma$ from the pixel 202 at the coordinates (k−1, m), error data $\delta$ from the pixel 203 at the coordinates (k−1, m+1) and error data $\alpha$ from the pixel 204 at the coordinates (k, m−1) are added.

Figure 6A:
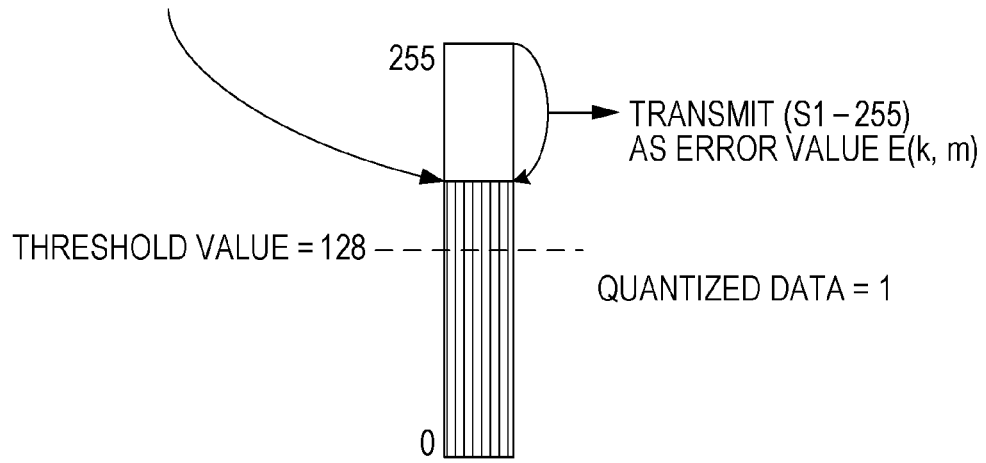
FIGS. 6A and 6B are diagrams for explaining an operating method by the first quantization operating unit according to the first embodiment.
Figure 6B:
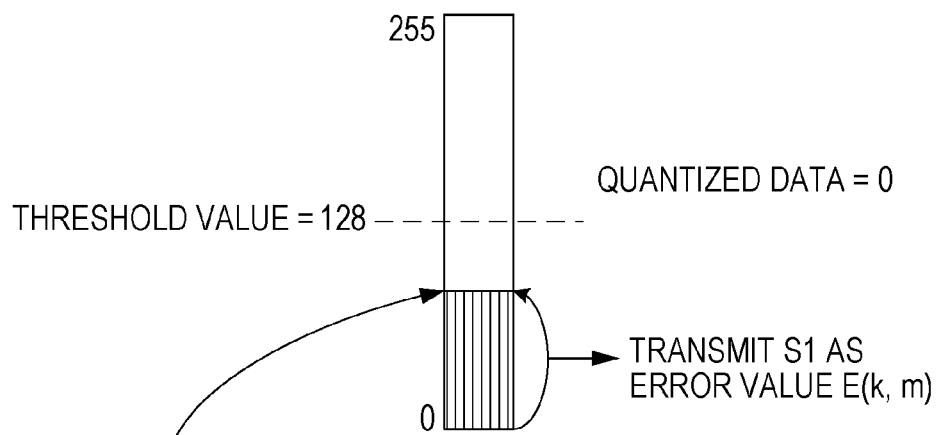
Figure 7:
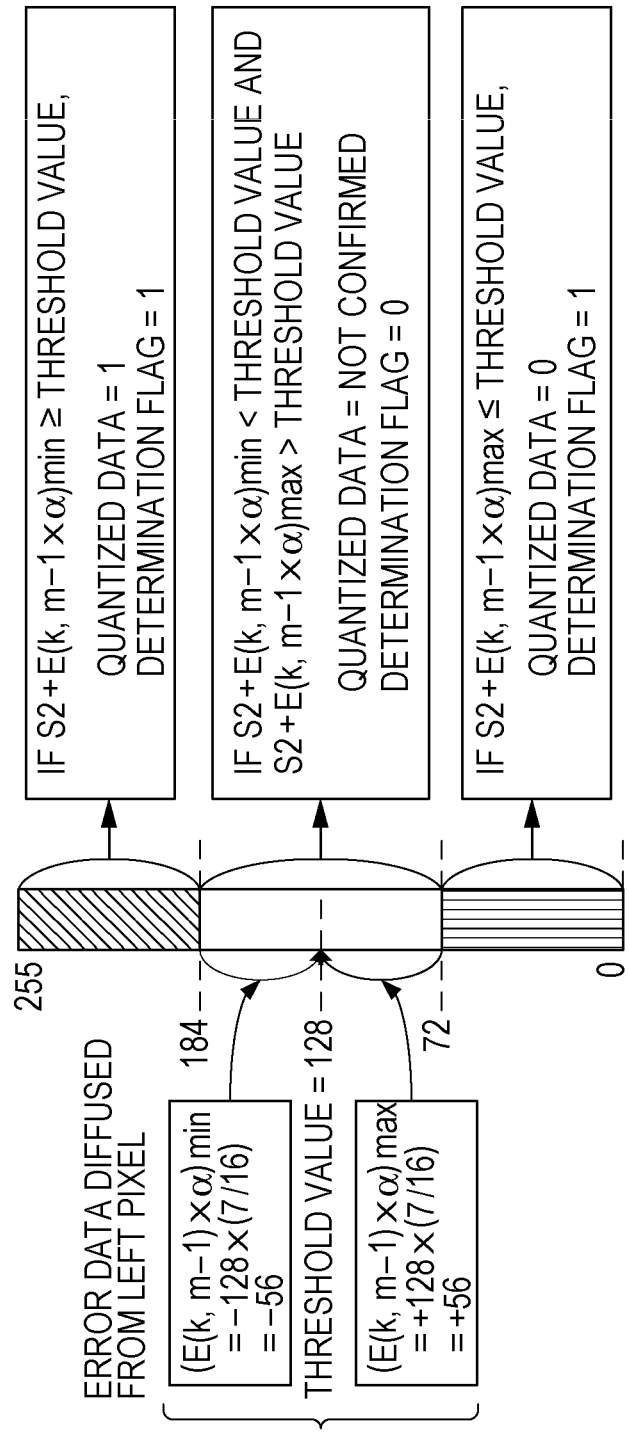
FIG. 7 is a diagram for explaining an operating method by a second quantization operating unit according to the first embodiment.

With reference to FIGS. 6A and 6B and FIG. 7, quantized data and error data calculation methods of the first quantization operating unit 911 in the first error diffusion unit 910 and the second quantization operating unit 921 in the second error diffusion unit 920 will be described in detail. FIGS. 6A and 6B and FIG. 7 illustrates a case where a first pixel and a second pixel on each line are to be processed. Input image data of this embodiment may be 8-bit data having a value of 0 to 255, and bi-level data may be output. A threshold value may be equal to 128.

FIGS. 6A and 6B are diagrams for explaining an operating method of the first quantization operating unit 911 in the first error diffusion unit 910. In the first quantization operating unit 911, a total of value (hereinafter, also called an "S1") of input image data, error data from a previous line, and error data from a same line is calculated. S1 and a threshold value (128 in this embodiment) are compared to acquire quantized data, and a first error value E(k, m) is calculated from the difference between S1 and the threshold value.

Referring to FIGS. 6A and 6B, S1 of a pixel at coordinates (k, m) is acquired by adding input image data A(k, m), error data $[E(k−1, m−1) \times \beta + E(k−1, m) \times \gamma + E(k−1, m+1) \times \delta]$ from a previous line, and error data $[E(k, m−1) \times \alpha]$ from a left pixel.

As illustrated in FIG. 6A, if "S1≥threshold value", quantized data=1. The first error value E(k, m)=S1−255.

As illustrated in FIG. 6B, if "S1<threshold value", quantized data=0. First error value E(k, m)=S1.

FIG. 7 is a diagram for explaining an operating method of the second quantization operating unit 921 in the second error diffusion unit 920. The second quantization operating unit 921 in the second error diffusion unit 920 calculates a total of value (hereinafter, also called "S2") of input image data and error data to be diffused from a pixel excluding the first pixel of interest. According to this embodiment, because a Floyd & Steinberg error diffusion method illustrated in FIG. 5A is applied, the "error data to be diffused from a pixel excluding the first pixel of interest" is error data from a previous line (upper line) only. The second error diffusion unit 920 processes the next pixel to the pixel to be processed by the first error diffusion unit 910. In other words, the second quantization operating unit 921 operates on a pixel at the coordinates (k, m+1).

The S2 of the pixel at the coordinates (k, m+1) is acquired by adding input image data A(k, m+1) and error data $[E(k−1, m) \times \beta + E(k−1, m+1) \times \gamma + E(k−1, m+2) \times \delta]$ from a previous line. S2 is error data of the first pixel of interest, that is, a value before error data from a left pixel is added.

The second quantization operating unit 921 calculates a determination flag indicating whether quantized data is fixed from S2 that is a total of value before the error data from the first pixel of interest is added. More specifically, whether quantized data is fixed or not is determined on the basis of whether the total of value S2 is equal to or lower than the first reference value or not and whether the total of value S2 is equal to or higher than a second reference value that is higher than the first reference value or not.

According to this embodiment, S2, a sum of the threshold value and a maximum value of possible values of error data from the first pixel of interest on a same line and a sum of the threshold value and a minimum value of possible values that error data from the first pixel of interest on the same line are compared to determine the determination flag. In other words, the first reference value is calculated from a threshold value set in the second error diffusion unit 920 and a maximum value of possible values that error data from the first pixel of interest on the same line. The second reference value is calculated from a threshold value set in the second error diffusion unit 920 and a minimum value of possible values that error data from the same line. If quantized data is fixed, the determination flag has 1. If quantized data is not fixed, the determination flag has 0.

According to this embodiment, error data is 8-bit data, and the threshold value is equal to 128. Thus, a maximum value (hereinafter also called a "$T_{max}$") of error data $(E(k, m) \times \alpha)$ to be diffused from a left pixel is $128 \times (7/16) = 56$. A minimum value (hereinafter also called a "$T_{min}$") of error data $(E(k, m) \times \alpha)$ to be diffused from a left pixel is $−128 \times (7/16) = −56$.

If $S2+T_{max} \geq$ threshold value, that is, if $S2 \geq 184$, the dot is fixed as ON before the addition of the error data from a left pixel. Thus, quantized data=1 and determination flag=1. In other words, it is determined that it is possible to process it in parallel with the previous processing. The relationship second error value E(k, m+1)=S2−255 is calculated.

If $S2+T_{min}$ ≤threshold value, that is, if S2≤72, the dot is fixed as OFF before the addition of the error data from a left pixel. Therefore, quantized data=0 and determination flag=1. The second error value E(k, m+1)=S2.

On the other hand, if $S2+T_{min}$<threshold value and $S2+T_{max}$>threshold value, that is, if 72<S2<184, the ON/OFF of the dot is fixed in accordance with the value of the error data to be diffused from a left pixel. In other words, the quantized data is not determined unless the value of error data to be diffused from a left pixel is added. Therefore, determination flag=0. In other words, it is determined that it is not possible to process it in parallel with the previous processing.

In this way, if a total of value before error data from a left pixel is added is equal to or higher than a sum of a threshold value and a minimum value of possible values of error data from a same line, the second quantization operating unit 921 determines as quantized data=1 and determination flag=1 and calculates the second error value. If a total of value before error data from a left pixel is added is equal to or lower than a sum of a threshold value and a minimum value of possible values of error data from a same line, the second quantization operating unit 921 determines as quantized data=0 and determination flag=1 and calculates the second error value. On the other hand, if a total of value before error data from a left pixel is added is higher than a sum of a threshold value and a minimum value of possible values of error data from a same line and is lower than a sum of the threshold value and a minimum value of possible values of error data from a same line, the quantized data may not be fixed. Therefore, determination flag=0.

Notably, the determination flag is saved in the register 204.

Figure 8A:
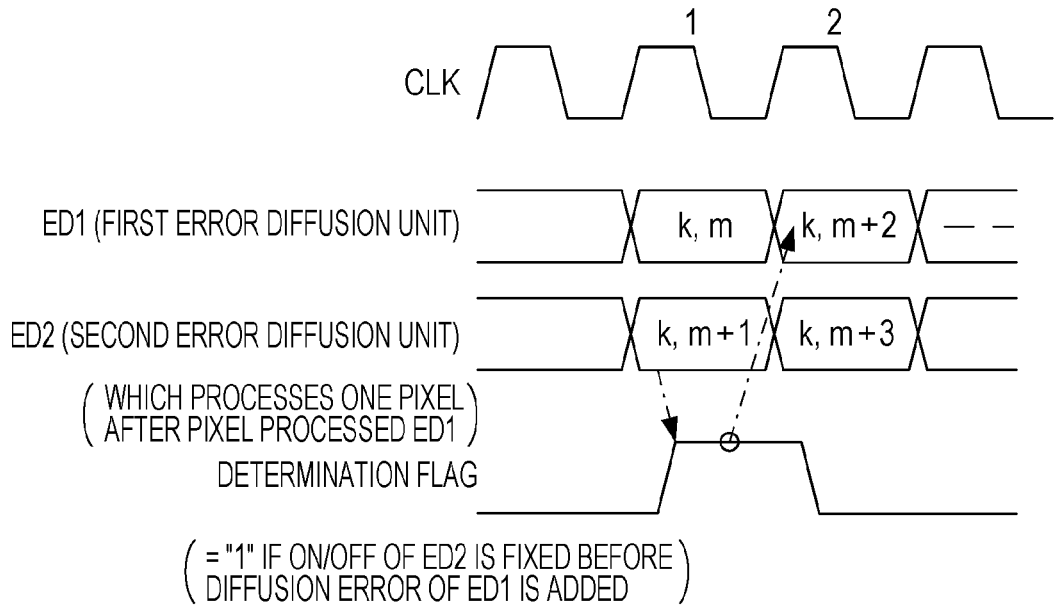
FIGS. 8A and 8B are timing charts each for a determination flag in an error diffusion processing according to the first embodiment.
Figure 8B:
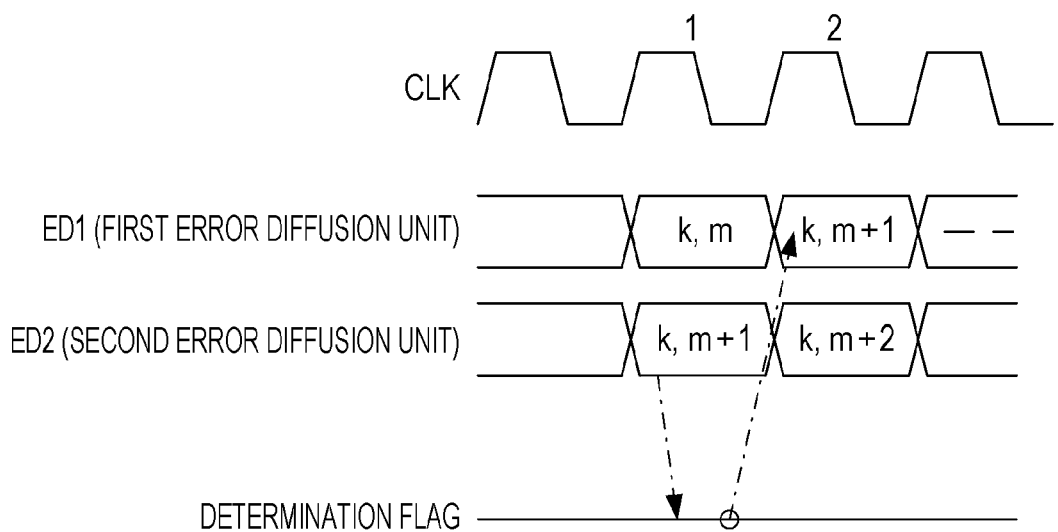

FIGS. 8A and 8B are timing charts for different determination flags in error diffusion processing.

Both FIGS. 8A and 8B illustrate, from the top, clocks (hereinafter also called "CLK"), coordinates of a subject pixel by a first error diffusion unit (hereinafter also called an "ED1"), coordinates of a subject pixel by a second error diffusion unit (hereinafter also called an "ED2"), and a determination flag.

FIG. 8A is a timing chart illustrating a case where quantized data is fixed by error diffusion processing in the second quantization operating unit 921, and determination flag=1. As illustrated in FIG. 8A, the ED1 performs error diffusion processing on a pixel at the coordinates (k, m) at a clock 1. In parallel with this, the ED2 performs error diffusion processing on a pixel at coordinates (k, m+1). In this case, the ED1 may perform the error diffusion processing illustrated in FIG. 6, and the ED2 may perform the error diffusion processing illustrated in FIG. 7.

If the ED2 determines as determination flag=1, the ED1 performs the error diffusion processing on a pixel at coordinates (k, m+2) and, in parallel with this, the ED2 performs the error diffusion processing on a pixel at coordinates (k, m+3), at the next clock 2.

FIG. 8B is a timing chart in a case where quantized data is not fixed by the error diffusion processing in the second quantization operating unit 921 and determination flag=0. As illustrated in FIG. 8B, at a clock 1, the ED1 performs the error diffusion processing on a pixel at the coordinates (k, m), and, in parallel with this, the ED2 performs the error diffusion processing on a pixel at coordinates (k, m+1), like the FIG. 8A.

If the ED2 determines as determination flag=0, the quantized data on the pixel at the coordinates (k, m+1) is not fixed. Thus, at the next clock 2, the ED1 performs the error diffusion processing on a pixel at coordinates (k, m+1). In parallel with this, the ED2 performs error diffusion processing on the next pixel to the coordinates (k, m+1), that is, a pixel at (k, m+2). Note that, at the clock 1, the error diffusion processing on a pixel at the coordinates (k, m) is determined, that is, the error data at a pixel at the coordinates (k, m) is determined.

Figure 9A:
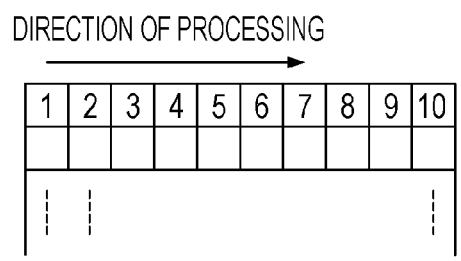
FIGS. 9A and 9B are timing charts for error diffusion processing according to the first embodiment.
Figure 9B:
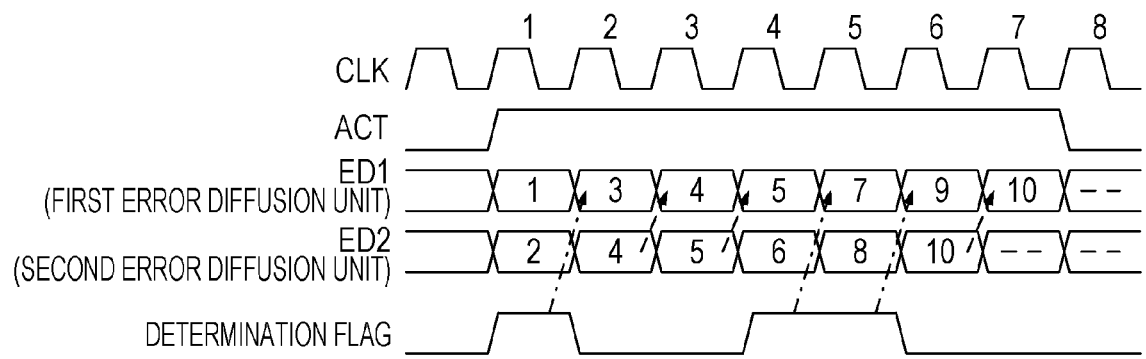

With reference to FIGS. 9A and 9B, the error diffusion processing of the ED1 and ED2 will be described in further detail. In FIGS. 9A and 9B, numbers denote pixel numbers. FIG. 9A illustrates a processing sequence on image data, and FIG. 9B illustrates an example of a timing chart for error diffusion processing. FIG. 9B illustrates, from the top, CLK, signal to being processed (hereinafter, also called an "ACT"), pixel number to be processed by the ED1, pixel number to be processed by the ED2, and determination flag.

As illustrated in FIG. 9A, error diffusion processing on image data is performed on line in a predetermined direction.

As illustrated in FIG. 9B, at a clock 1, an ACT signal is asserted, and the ED1 performs error diffusion processing on a pixel 1, and the ED2 performs error diffusion processing on a pixel 2 next to the pixel 1.

Next, if determination flag=1 by ED2 at the clock 1, it means that the error diffusion processing up to the pixel 2 has been finished. Thus, at the next clock 2, the ED1 performs error diffusion processing on a pixel 3, and the ED2 performs error diffusion processing on a pixel 4 next to the pixel 3.

Next, if the determination flag=0 by the ED2 at the clock 2, it means that the quantized data for the pixel 4 is not fixed. Thus, at the next clock 3, the ED1 performs error diffusion processing on the pixel 4 again, and the ED2 performs error diffusion processing on a pixel 5 next to the pixel 4. The same operations are sequentially repeated.

Referring to FIG. 9B, the determination flag=1 is acquired three times. Therefore, error diffusion processing on 10 pixels may be performed at 7 clocks. Performing error diffusion processing on 10 pixels has required 10 clocks in a method in the past. However, according to this embodiment, error diffusion processing on 10 pixels may be performed in the number of clocks that is fewer than 10 clocks by the number of times that determination flag=1 is acquired.

This allows higher speed error diffusion processing without compromising effects by an error diffusion method, that is, by maintaining equal image quality to that provided by a normal error diffusion method.

With reference to FIGS. 10A and 10B, an error data addition method according to the first embodiment will be described. FIGS. 10A and 10B are explanatory diagrams regarding an error data addition method according to the first embodiment. In FIG. 10, a pixel of interest of the first error diffusion processing unit at a next clock is a pixel at the coordinates (k, m).

FIG. 10A illustrates how error data is diffused when quantized data is fixed by the second quantization operating unit 921 at a previous clock, that is, when determination flag=1. In this case, at a previous clock, a first error value E(k, m−1) of a pixel (coordinates (k, m−1)) one before the pixel of interest at the coordinates (k, m) and a second error value E(k, m−2) of a pixel (coordinates (k, m−2)) two before the pixel of interest are determined simultaneously.

Therefore, the error data from a same line is a sum of error data from a pixel two before the pixel of interest and error data of a pixel one before the pixel of interest. According to this embodiment, error data from a same line is a sum of a value acquired by multiplying an error value E(k, m−2) from a pixel at coordinates (k, m−2) by the diffusion coefficient α twice and a value acquired by multiplying an error value E(k, m−1) from a pixel at coordinates (k, m−1) by the diffusion coefficient α once. In other words, at this clock, the first quantization operating unit 911 is added a total of input image data A(k, m), error data from a previous line, a value acquired by multiplying an error value E(k, m−2) from a pixel at coordinates (k, m−2) by the diffusion coefficient α twice and a value acquired by multiplying an error value E(k, m−1) from a pixel at coordinates (k, m−1) by the diffusion coefficient α once.

Error data to be diffused to a next line undergoes the following operations.

To a pixel at the coordinates (k−1, m−2), not illustrated, a value acquired by multiplying an error value E(k, m−2) by diffusion coefficient γ (which corresponds to first error data 933 which will be described below) is added as error data to be diffuse from a pixel at coordinates (k, m−2). A value acquired by multiplying an error value E(k, m−2) by diffusion coefficients α and δ and a value acquired by multiplying error data E(k, m−1) by the coefficient δ (which corresponds to second error data 935 which will be described below) are added as error data to be diffused from a pixel at coordinates (k, m−1).

To a pixel at coordinates (k−1, m−1), not illustrated, a value acquired by multiplying an error value E(k, m−2) by β is added as error data to be diffused from a pixel at coordinates (k, m−2) (which corresponds to first error data 933, which will be described below). As error data to be diffused from a pixel at coordinates (k, m−1), a value acquired by multiplying an error value E(k, m−2) by coefficients α and γ and a value acquired by multiplying an error value at E(k, m−1) by the coefficient γ (which corresponds to the second error data 935, which will be described below) are added.

To a pixel at the coordinates (k−1, m), a value acquired by multiplying an error value E(k, m−2) by the coefficients α and β is added and a value acquired by multiplying an error value E(k, m−1) by the coefficient β is added, as error data to be diffused from the pixel at the coordinates (k, m−1) (which corresponds to the second error data 935, which will be described below).

FIG. 10B illustrates how error data is diffused when quantized data is not fixed by the second quantization operating unit 921 at a previous clock, that is, when determination flag=0. In this case, though a pixel of interest at the coordinates (k, m) has been processed by the second quantization operating unit 921 at a previous clock, the pixel at the coordinates (k, m) undergoes error diffusion processing by the ED1 again at this clock.

Therefore, error data from a same line is only error data of a pixel one before the pixel of interest. In other words, a value acquired by multiplying an error value E(k, m−1) of a pixel (coordinates (k, m−1)) one before the pixel at the coordinates (k, m) by the coefficient α.

Error data on a lower line undergoes following operations.

To a pixel at coordinates (k−1, m−2), a value acquired by multiplying the error value E(k, m−1) by the diffusion coefficient δ is added (which corresponds to the first error data 933, which will be described below).

To a pixel at coordinates (k−1, m−1), a value acquired by multiplying the error value E(k, m−1) by the diffusion coefficient γ (which corresponds to the first error data 933, which will be described below) is added.

To a pixel at coordinates (k−1, m), a value acquired by multiplying the error value E(k, m−1) by the diffusion coefficient β (which corresponds to the first error data 933, which will be described below) is added.

Referring back to FIG. 4, the configuration of the quantization processing unit 202 in the image processing unit 103 will be described in detail. FIG. 4 is a detail block diagram of the quantization processing unit 202.

As illustrated in FIG. 4, the quantization processing unit 202 includes an input control unit 900, a first error diffusion unit 910, a second error diffusion unit 920, and an output control unit 930. As in this configuration, a recording apparatus according to the first embodiment illustrated in FIG. 4 includes two error diffusion units, and the two error diffusion units operate in parallel. In FIG. 4, a first pixel of interest to be processed by the first error diffusion unit 910 is a pixel at the coordinates (k, m), a second pixel of interest to be processed by the second error diffusion unit 920 is a pixel at coordinates (k, m+1).

The input control unit 900 includes an input data control unit 901, a first adding unit 902, and a second adding unit 903.

The first adding unit 902 adds first input image data A(k, m) and error data from a previous line. The first input image data is input from a RAM through the DMAC 206 and color conversion processing unit 201. The error data from a previous line is input from an error memory through the DMAC 208 and is error data [E(k−1, m−1)×β+E(k−1, m)×γ+E(k−1, m+1)×δ)] from the previous line. The first input image data and the error data from a previous line are added to calculate first input data, which is then transmitted to the first error diffusion unit (ED1) 910.

The second adding unit 903 adds second input image data A(k, m+1) and error data from a previous line. The second adding unit 903 operates simultaneously with an operation of the first adding unit 902. The second input image data is input from a RAM through the DMAC 206 and color conversion processing unit 201. The error data from a previous line is input from an error memory through the DMAC 208 and is error data [E(k−1, m)×β+E(k−1, m+1)×γ+E(k−1, m+2)×δ)] from the previous line. The second input image data 904 and error data from a previous line are added to calculate second input data, which is then transmitted to the second error diffusion unit (ED2) 920.

The first error diffusion unit 910 includes a first quantization operating unit 911 which performs quantization and a first coefficient multiplying unit 912. The first error diffusion unit 910 further includes multiplying unit 913 which multiplies the error data (E(k, m)×α) calculated from the first coefficient multiplying unit 912 by the diffusion coefficient α, a multiplying unit 914 which multiplies it by diffusion coefficients β, γ, δ, a selector 915 for error data, and adding units 916 and 917.

The adding unit 916 adds first input data received from the adding unit 902 and error data from a pixel on a same line selected by the selector 915, and a resulting sum is transmitted to the first quantization operating unit 911. The selector 915 here selects error data E1(k, m−1)×α if determination flag=0 and selects a value acquired by adding error data E1(k, m−2)×(the square of α) and error data E2(k, m−1)×α if determination flag=1.

On the basis of a threshold value stored in the register 204, the first quantization operating unit 911 quantizes an input value to a bi-level value and calculates an error value E(k, m). The first quantization operating unit 911 operates as described with reference to FIGS. 6A and 6B. The result of the quantization by the first quantization operating unit 911 is transmitted as first quantized data a(k, m) 932 to the output control unit 930. On the other hand, the error value E(k, m) calculated by the first quantization operating unit 911 is transmitted to the first coefficient multiplying unit 912.

The first coefficient multiplying unit 912 multiplies an error value by a coefficient for each pixel the error value is diffused, as illustrated in FIGS. 5A and 5B. A value acquired by multiplying an error value E(k, m) by the diffusion coefficient α in the first coefficient multiplying unit 912 is transmitted to the selector 915 as error data to be diffused to a next pixel on a same line. The value acquired by multiplying the error value E(k, m) by the diffusion coefficient α is further transmitted to the multiplying unit 913 and multiplying unit 914. On the other hand, the values acquired by multiplying the error value E(k, m) by the coefficients β, γ, and δ in the first coefficient multiplying unit 912 are transmitted to the output control unit 930 as the first error data 933 for diffusion to a next line.

The multiplying unit 913 multiplies the error data E(k, m)×α by the coefficient α and transmits the result to the adding unit 917. The adding unit 917 adds error data E(k, m)×(the square of α) and the error data E(k, m+1)×α transmitted from the second error diffusion unit 920, which will be described below, and transmits the result to the selector 915.

The multiplying unit 914 multiplies the error data E(k, m)×α by the coefficients β, γ, and δ and transmits the result to the adding unit 923 in the second error diffusion unit 920.

On the other hand, the second error diffusion unit 920 includes a second quantization operating unit 921 which performs quantization, a second coefficient multiplying unit 922, and an adding unit 923.

The second quantization operating unit 921 determines the determination flag on the basis of a threshold value stored in the register 204, a S2, a sum of the threshold value and a maximum value of possible values of error data from a same line, and a sum of the threshold value and a minimum value of possible values of error data from the same line. The resulting determination flag is transmitted to the input data control unit 901, selector 915, and output control unit 931.

The second quantization operating unit 921 quantizes the second input data to bi-level data and calculates an error value E(k, m+1). The second quantization operating unit 921 operates as in FIG. 7. The result of the quantization by the second quantization operating unit 921 is transmitted to the output control unit 930 as second quantized data a(k, m+1) 934. On the other hand, the error value calculated by the second quantization operating unit 921 is transmitted to the second coefficient multiplying unit 922.

The second coefficient multiplying unit 922 multiplies an error value by a coefficient for each pixel to which the error value is diffused. The value acquired by multiplying the error value E(k, m+1) by the coefficient α in the second coefficient multiplying unit 922 is transmitted to the selector 915 as error data to be diffused to a next pixel on a same line. On the other hand, values acquired by multiplying the error value E(k, m+1) by the coefficients β, γ, and δ in the coefficient multiplying unit 922 are transmitted to the adding unit 923.

The adding unit 923 adds the error data [values acquired by multiplying E(k, m+1) by the coefficients β, γ, and δ] transmitted from second coefficient multiplying unit 922 and error data [values acquired by multiplying E(k, m) by the coefficients β, γ, δ] transmitted from the first error diffusion unit 910. The result of the addition is transmitted to the output unit 930 as second error data 935 to diffuse it to a next line.

If determination flag=0, the output data control unit 931 does not use the second quantized data 934 and second error data 935 but controls so as to save the first quantized data 932 in the RAM 115 and save the first error data 933 in an error memory. If determination flag=1, the output data control unit 931 controls so as to save the first quantized data 932 and second quantized data 934 in the RAM 115 and save the first error data 933 and second error data 935 in an error memory.

The output control unit 930 has a register which holds an error accumulated value in order to distribute error data to a next line. This register has a memory area which holds error data accumulated at each pixel position because error data is distributed to three pixels on a next line from one pixel of interest, as illustrated in FIG. 5. When error data are accumulated at one pixel position (or when the addition of error data "B", "C", and "D" completes), its error value is output to the error memory.

Figure 11:
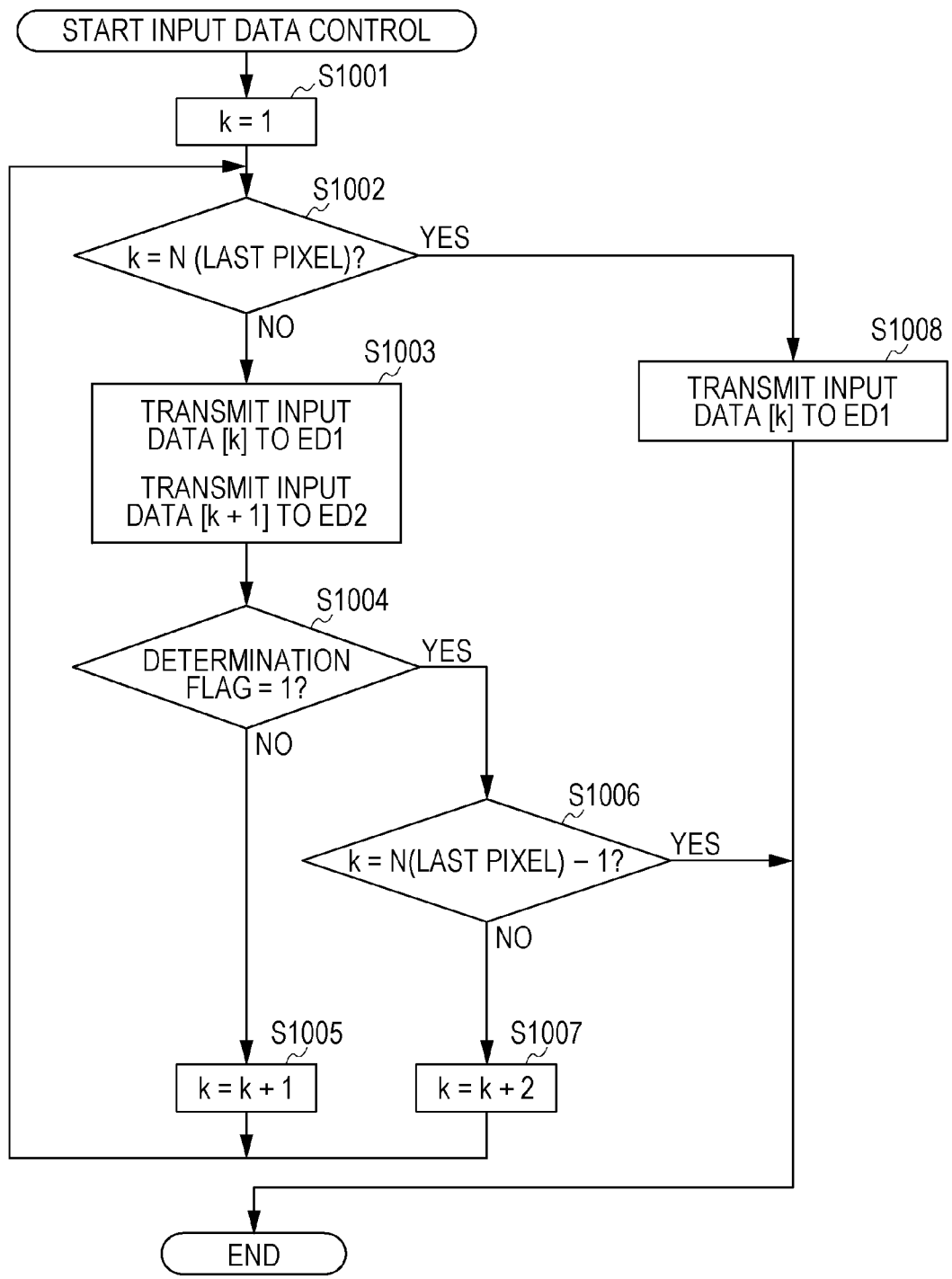
FIG. 11 illustrates a processing flow by an input data control unit according to the first embodiment.

With reference to FIG. 11, a processing routine of the input control unit 900 will be described in detail. FIG. 11 illustrates a processing flow of the input control unit 900. In this case, a pixel number is k, and a final pixel number is N.

Input data control starts in response to reception of data, and an initial value=1 is substituted into k in step 1001.

Next, in step 1002, whether k=N (final pixel) or not is determined. If not, the processing moves to step 1003. A first input data [k] is transmitted to the ED1, and second input data [k+1] is transmitted to the ED2.

In step 1004, whether determination flag=1 or not is determined. If determination flag=0, the processing moves to step 1005 where k=k+1 is defined. Then, the processing returns to step 1002 where ED1 again processes the pixel of k+1 which has been processed by the ED2. If determination flag=1, the processing moves to step 1006 whether k=N−1 or not is determined. If k=N−1, it means that the ED2 has processed the final pixel in step 1003. Thus, the processing ends. If k is not defined as N−1, the k=k+2 is defined in step 1007. Then, the processing returns to step 1002.

If k=N in step 1002, the processing moves to step 1008 where the first input data [k=N] is transmitted to the ED1. After that, the processing ends.

Figure 12:
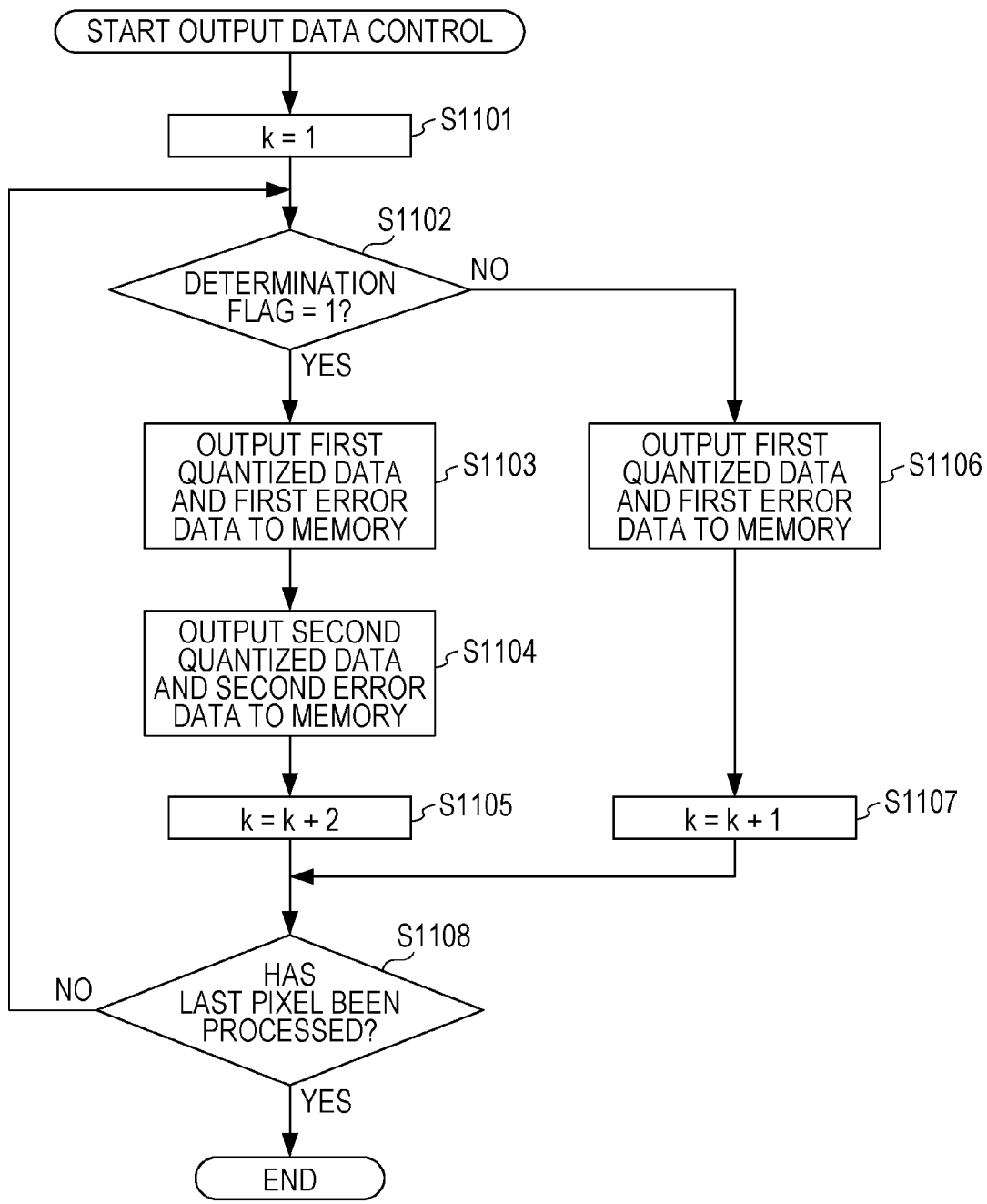
FIG. 12 illustrates a processing flow by an output data control unit according to the first embodiment.

With reference to FIG. 12, a processing routine of the output control unit 930 will be described in detail. FIG. 12 illustrates a processing flow of the output control unit 930. Also in this case, the pixel number is k, and the final pixel number is N.

Output data control starts in response to reception of data, and an initial value=1 is substituted into k in step 1101.

Next, in step 1102, whether determination flag=1 or not is determined.

If determination flag=1, the processing moves to step 1103 where first quantized data and first error data are output to memory. Further in step 1104, second quantized data and second error data are output to memory. The processing moves to step 1105 where k=k+2 is defined. Then, the processing moves to step 1108.

On the other hand, if determination flag=0, first quantized data and first error data are output to memory in step 1106. The processing moves to step 1107 where k=k+1 is defined. Then, the processing moves to step 1108. In other words, second quantized data and second error data are not output to memory.

In step 1108, whether the final pixel N has been processed or not is determined. If the final pixel N has not been processed, the processing returns to step 1102 and the operations are repeated. If the final pixel N has been processed, the processing ends.

According to this embodiment, as described above, the first error diffusion unit 910 and the second error diffusion unit 920 are caused to operate in parallel. If determination flag=1 for the second quantization operating unit 921, the second error diffusion unit 920 may continue the error diffusion processing without adding error data on a same line. In other words, if determination flag=1 for the second quantization operating unit 921, the processing may not be required to wait for error data on a same line. At a next clock, the first error diffusion unit 910 performs an error diffusion process on a next pixel to the pixel processed by the second quantization operating unit 921. Therefore, the speed of the error diffusion processing may be increased by the amount equivalent to the number of determination of determination flag=1 for the second quantization operating unit 921.

Thus, higher speed error diffusion processing than normal error diffusion processing may be achieved without compromising effects by an error diffusion method.

Second Embodiment

Figure 13:
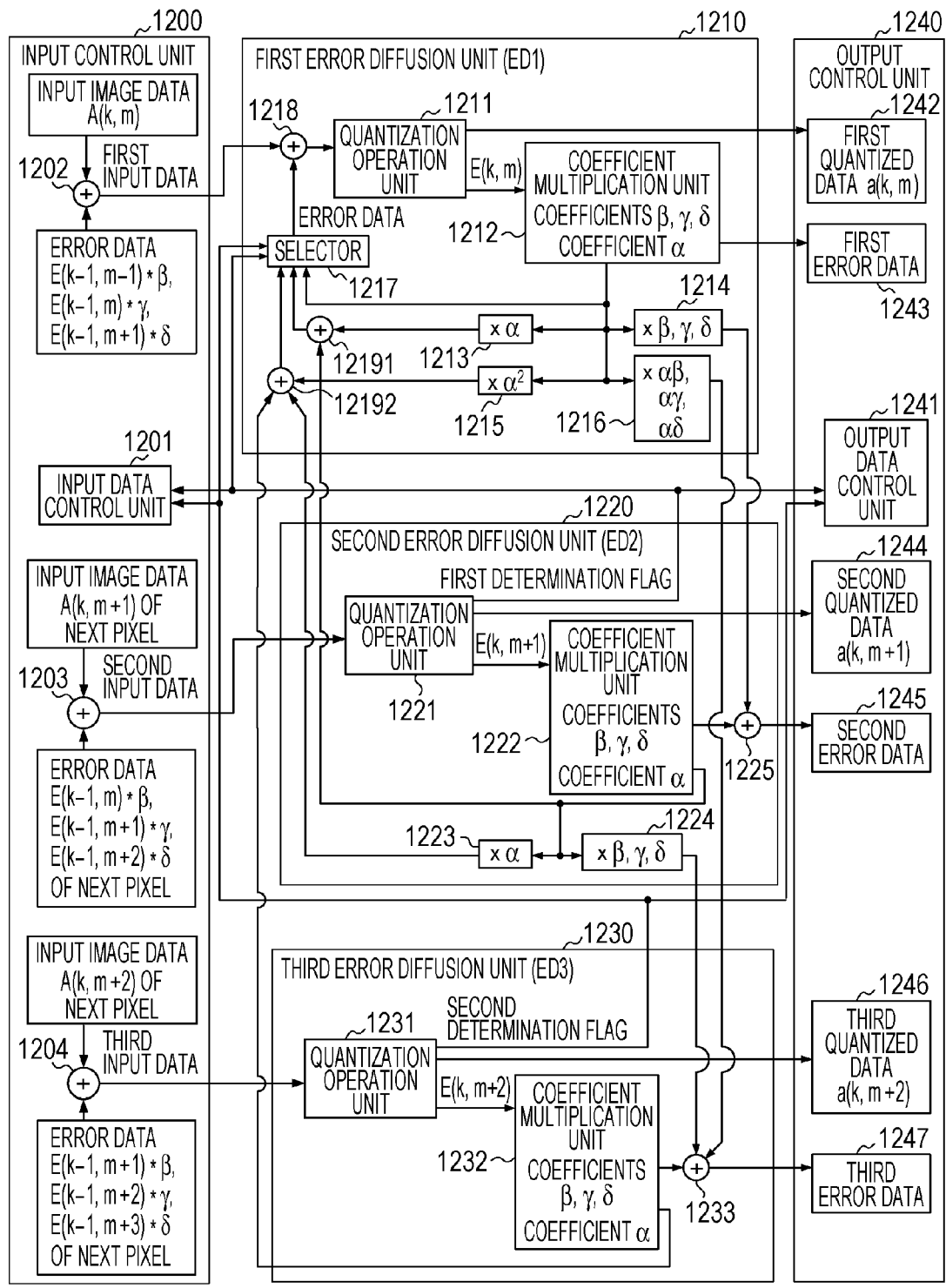
FIG. 13 is a functional block diagram illustrating a configuration of a quantization processing unit according to a second embodiment.

This embodiment is similar to the first embodiment except for a configuration of the quantization processing unit 202 in the image processing unit 103. The repeated descriptions will be omitted. FIG. 13 is a block diagram illustrating a configuration of the quantization processing unit 202 according to the second embodiment.

As illustrated in FIG. 13, the quantization processing unit 202 includes an input control unit 1200, a first error diffusion unit 1210, a second error diffusion unit 1220, a third error diffusion unit (hereinafter, also called an ED3) 1230, and an output control unit 1240. In this manner, a recording apparatus according to the second embodiment illustrated in FIG. 13 has three error diffusion units, and the three error diffusion units operate in parallel. In the following descriptions, a first pixel of interest to be processed by the ED1 is a pixel at the coordinates (k, m), a second pixel of interest to be processed by the ED2 is a pixel at coordinates (k, m+1), a third pixel of interest to be processed by the ED3 is a pixel at coordinates (k, m+2).

The input control unit 1200 includes an input data control unit 1201, a first adding unit 1202, a second adding unit 1203, and a third adding unit 1204.

The first adding unit 1202 corresponds to the first adding unit 902 of the first embodiment and therefore will be described briefly. The first adding unit 1202 adds input image data A(k, m) and error data from a previous line. Input image data and error data from a previous line are added to calculate first input data, which is then transmitted to the first error diffusion unit (ED1) 1210.

The second adding unit 1203 corresponds to the second adding unit 903 of the first embodiment and therefore will be described briefly. The second adding unit 1203 adds input image data A(k, m+1) and error data from a previous line. The second input image data and error data from a previous line are added to calculate second input data, which will be transmitted to the second error diffusion unit (ED2) 1220.

The third adding unit 1204 adds input image data A(k, m+2) and error data from a previous line. The third adding unit 1204 operates in parallel with operations of the first adding unit 1202 and second adding unit 1203. The input image data A(k, m+2) is input from a RAM through the DMAC 206 and color conversion processing unit 201. The error data from a previous line is input from an error memory through the DMAC 208 and is E(k−1, m+1)×β+E(k−1, m+2)×γ+E(k−1, m+3)×δ). The input image data and error data from a previous line are added to calculate third input data, which will be transmitted to the third error diffusion unit (ED3) 1230.

The first error diffusion unit 1210 includes a first quantization operating unit 1211 which performs quantization, a first coefficient multiplying unit 1212, a selector 1217, adding units 1218, 12191, and 12192. The first error diffusion unit 1210 further includes a multiplying unit 1213 which multiplies error data E(k, m)×α calculated from the coefficient multiplying unit 1212 by the coefficient α and a multiplying unit 1215 which multiplies error data E(k, m)×α by the square of α. The first error diffusion unit 1210 further includes a multiplying unit 1214 which multiplies error data E(k, m)×α by coefficients β, γ, and δ and a multiplying unit 1216 which multiplies error data E(k, m)×α by coefficients αβ, αγ, and αδ.

The adding unit 1218 adds first input data received from the first adding unit 1202 and error data from a previous pixel selected nu the selector 1217, which will be transmitted to the first quantization operating unit 1211. If first determination flag=0, the selector 1217 selects error data E(k, m−1)×α. If first determination flag=1 and second determination flag=0, a value acquired by adding error data E(k, m−2)×(the square of α) and error data E(k, m−1)×α is selected. If first determination flag=1 and second determination flag=1, a value acquired by adding error data (k, m−3)×(the cube of α), error data E(k, m−2)×(the square of α), and error data E(k, m−1)×α. The first determination flag and second determination flag will be described in detail below.

The first quantization operating unit 1211 quantizes a value input from the adding unit 1218 to a bi-level value on the basis of a threshold value stored in the register 204 and calculates an error value. The first quantization operating unit 1211 operates as in FIG. 6. The result of quantization by the first quantization operating unit 1211 is transmitted to the output control unit 1240 as first quantized data a(k, m) 1242. On the other hand, an error value calculated by the first quantization operating unit 1211 is transmitted to the first coefficient multiplying unit 1212.

The first coefficient multiplying unit 1212 multiplies an error value by a coefficient for each pixel the error value is diffused. A value acquired by multiplying an error value E(k, m) by the diffusion coefficient α in the first coefficient multiplying unit 1212 is transmitted to the selector 1217 as error data to be diffused to a next pixel on a same line. A value acquired by multiplying the error value E(k, m) by the coefficient α is transmitted to the multiplying unit 1213, multiplying unit 1214, multiplying unit 1215, and multiplying unit 1216. On the other hand, values acquired by multiplying the error value E(k, m) by coefficients β, γ, and δ in the coefficient multiplying unit 1212 are transmitted to the output control unit 1240 as first error data 1243 to be diffused to a next line.

A value acquired by multiplying the error value E(k, m) by the coefficient α is multiplied by the coefficient α in the multiplying unit 1213 and is then transmitted to the adding unit 1219. The adding unit 12191 adds error data E(k, m)×(the square of α) and error data E(k, m+1)×α transmitted from the second error diffusion unit 1220, and the result is transmitted to the selector 1217.

A value acquired by multiplying the error value E(k, m) by the coefficient α is multiplied by (the square of α) in the multiplying unit 1215 and is then transmitted to the adding unit 12192. The adding unit 12192 adds error data E(k, m)× (the cube of α), error data E(k, m+1)×(the square of α) transmitted from the second error diffusion unit 1220, and error data E(k, m+2)×(the cube of α) transmitted from the third error diffusion unit 1230. The result of the addition is transmitted to the selector 1217.

The second error diffusion unit 1220 includes a second quantization operating unit 1221 which performs quantization, a second coefficient multiplying unit 1222, a multiplying unit 1223, a multiplying unit 1224, and an adding unit 1225.

The second quantization operating unit 1221 determines a first determination flag on the basis of a S2, a sum of threshold value and a maximum value of possible values of error data from a same line, and a sum of the threshold value and a minimum value of possible values of error data from the same line. The resulting first determination flag is transmitted to the input data control unit 1201, selector 1217, and output data control unit 1241.

The second quantization operating unit 1221 quantizes second input data to bi-level data and calculates a second error value E(k, m+1). The second quantization operating unit 1221 operates in the same manner as that of the second quantization operating unit 921 of the first embodiment. The result of the quantization by the second quantization operating unit 1221 is transmitted to the output control unit 1240 as second quantized data a(k, m+1) 1241. On the other hand, the error value calculated in the second quantization operating unit 1221 is transmitted to the second coefficient multiplying unit 1222.

The second coefficient multiplying unit 1222 multiplies an error value by a coefficient for each pixel the error value is diffused. A value acquired by multiplying the error value E(k, m+1) by the coefficient α in the second coefficient multiplying unit 1222 is transmitted to the adding unit 12191, adding unit 12192, multiplying unit 1223, and multiplying unit 1224. On the other hand, values acquired by multiplying the error value E(k, m+1) by the coefficients β, γ, and δ in the second coefficient multiplying unit 1222 are transmitted to the adding unit 1225.

The adding unit 1225 adds the error data [values acquired by multiplying E(k, m+1) by coefficients β, γ, and δ] transmitted from the second coefficient multiplying unit 1222 and the error data [values acquired by multiplying E(k, m) by the coefficients β, γ, and δ ] transmitted from the first error diffusion unit 1210. The result of the addition is transmitted to the output control unit 1240 as second error data 1245 to be diffused to a next line.

The multiplying unit 1223 multiplies the error data E(k, m+1)×α by the coefficient α and transmits the result to the adding unit 12192. The multiplying unit 1224 multiplies the error data E(k, m+1)×α by the coefficients β, γ, and δ and transmits the result to the adding unit 1233 in the third error diffusion unit 1230.

The third error diffusion unit 1230 includes a quantization operating unit 1231 which performs quantization, a coefficient multiplying unit 1232, and an adding unit 1233.

The third quantization operating unit 1221 determines a second determination flag on the basis of a S2, a sum of threshold value and a maximum value of possible values of error data from a same line, and a sum of the threshold value and a minimum value of possible values of error data from the same line. The resulting second determination flag is transmitted to the input data control unit 1201, selector 1217, output data control unit 1241.

The third quantization operating unit 1231 quantizes third input data to bi-level data and calculates the error value E(k, m+2).

How the third quantization operating unit 1231 operates will be described briefly below.

The third quantization operating unit 1231 in the third error diffusion unit 1230 calculates a total of value (hereinafter also called an "S3") of input image data and error data to be diffused from a pixel excluding the first pixel of interest and second pixel of interest. According to this embodiment, because a Floyd & Steinberg error diffusion method illustrated in FIG. 5A is applied, the "error data to be diffused from a pixel excluding the first pixel of interest" is error data from a previous line (upper line) only.

The third error diffusion unit 1230 processes the next pixel to the pixel to be processed by the second error diffusion unit 1220. In other words, third quantization operating unit 1231 operates on a pixel at the coordinates (k, m+2).

The S3 of the pixel at the coordinates (k, m+2) is acquired by adding input image data A(k, m+2) and error data [E(k−1, m+1)×β+E(k−1, m+2)×γ+E(k−1, m+3)×δ] from a previous line. S3 is error data from the same line and, more specifically, is a value before error data from a left pixel is added.

The third quantization operating unit 1231 calculates a determination flag indicating whether quantized data is fixed from S3 that is a total of value before error data from the first pixel of interest and second pixel of interest on the same line are added. More specifically, whether the quantized data is fixed or not is determined on the basis of whether the total of value S3 is equal to or lower than a first reference value or not and whether the total of value S3 is equal to or higher than a second reference value that is higher than the first reference value or not.

According to this embodiment, whether the determination flag is 1 or 0 is determined by comparing S3, a sum of a threshold value and a maximum value of possible values of error data from the first pixel of interest and second pixel of interest on the same line and a sum of the threshold value and a minimum value of possible values of error data from the first pixel of interest and second pixel of interest on the same like. In other words, the first reference value is calculated from a threshold value set in the third error diffusion unit 1230 and a maximum value of possible values of error data from the first pixel of interest and second pixel of interest on the same line. The second reference value is calculated from a threshold value set in the third error diffusion unit 1230 and a minimum value of possible values of error data from the first pixel of interest and second pixel of interest on the same line. Because the third quantization operating unit 1231 operates as illustrated in FIG. 7, the description will be omitted.

The result of the quantization in the third quantization operating unit 1231 is transmitted to the output control unit 1240 as third quantized data a(k, m+2) 1246. On the other hand, the error value calculated in the third quantization operating unit 1231 is transmitted to the third coefficient multiplying unit 1232.

The third coefficient multiplying unit 1232 multiplies an error value by a coefficient for each pixel the error value is diffused. The value acquired by multiplying the error value E(k, m+2) by the coefficient α in the third coefficient multiplying unit 1232 is transmitted to the selector 1217. On the other hand, values acquired by multiplying the error value E(k, m+2) by the coefficients β, γ, and δ in the third coefficient multiplying unit 1232 are transmitted to the adding unit 1233.

The adding unit 1233 adds error data [values acquired by multiplying E(k, m+2) by the coefficients β, γ, and δ] transmitted from a third coefficient multiplying unit 1232, error data [values acquired by multiplying E(k, m+1) by the coefficients β, γ, and δ ] transmitted from the second error diffusion unit 1220, and error data [values acquired by multiplying E(k, m) by the coefficients β, γ, and δ ] transmitted from the first error diffusion unit 1210. The result of the addition is transmitted to the output control unit 1240 as third error data 1247 to be diffused to a next line.

If first determination flag=0, the output data control unit 1241 does not use the second quantized data 1244 and second error data 1245 and the third quantized data 1246 and third error data 1247. The output data control unit 1241 controls so as to save the first quantized data 932 in the RAM 115 and save the first error data 1243 in an error memory. If first determination flag=1 and second determination flag=0, the third quantized data 1246 and third error data 1247 are not used. The output data control unit 1241 controls so as to save the first quantized data 1242 and second quantized data 1244 in the RAM 115 and save the first error data 1243 and second error data 1245 in an error memory. On the other hand, if first determination flag=1 and second determination flag=1, the output data control unit 1241 controls so as to save the first quantized data 1242, second quantized data 1244, and third quantized data 1246 in the RAM 115. The output data control unit 1241 controls so as to save the first error data 1243, second error data 1245, and third error data 1247 in an error memory.

The output control unit 1240 has a register which holds an error accumulated value in order to distribute error data to a next line. This register has a memory area which holds error data accumulated at each pixel position because error data is distributed to three pixels on a next line from one pixel of interest, as illustrated in FIG. 5. When error data are accumulated at one pixel position (or when the addition of error data "B", "C", and "D" completes), its error value is output to the error memory.

Figure 14:
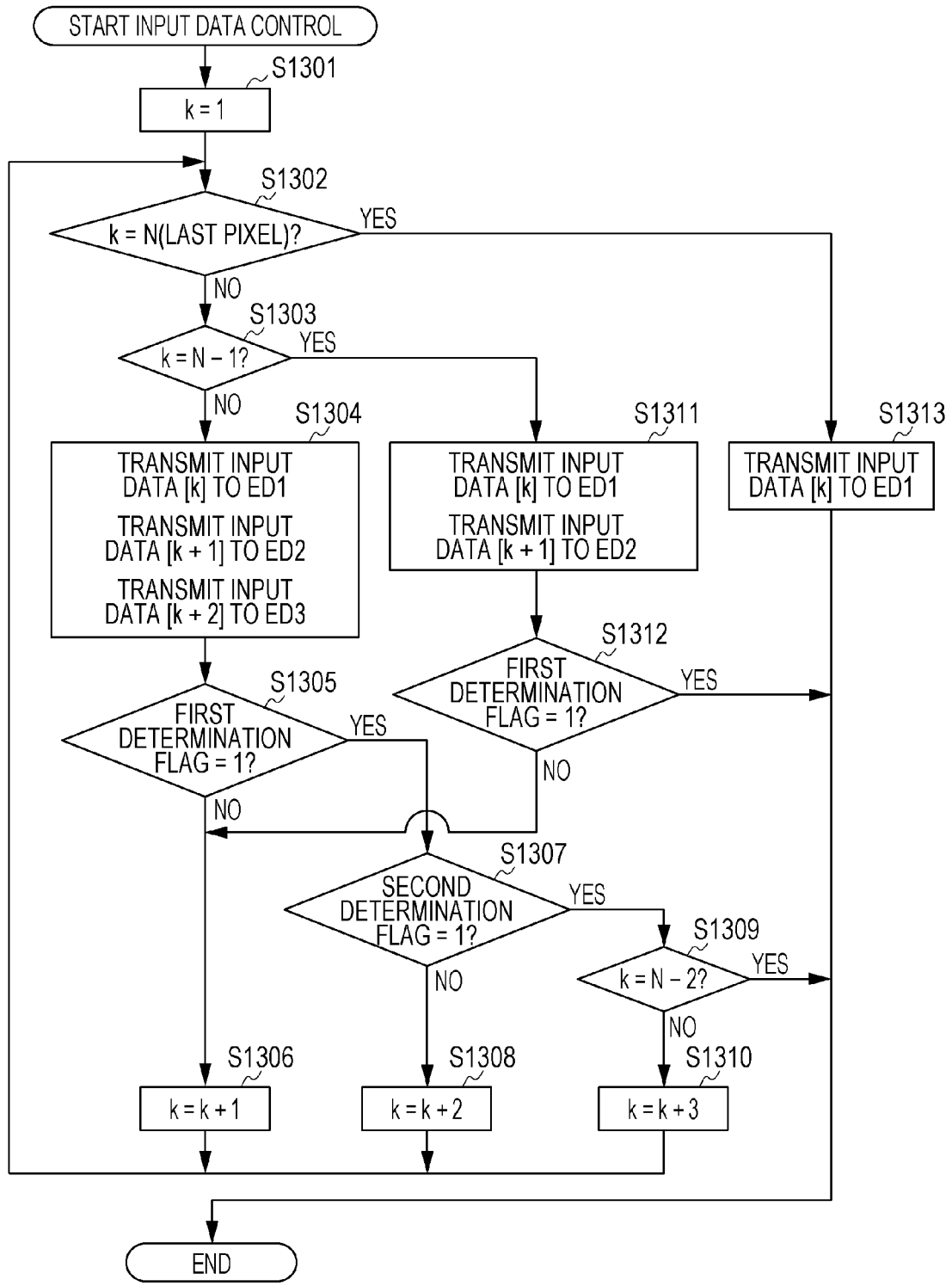
FIG. 14 illustrates a processing flow by an input data control unit according to the second embodiment.

With reference to FIG. 14, a processing routine of the input control unit 1200 will be described in detail. FIG. 14 illustrates a processing flow of the input control unit 1200. In this case, a pixel number is k, and a final pixel number is N.

Input data control starts in response to reception of data, and an initial value=1 is substituted into k in step 1301.

Next, in step 1302, whether k=N (final pixel) or not is determined.

If not, whether k=N−1 or not is determined in step 1303. If not, the processing moves to step 1304.

In step 1304, the first input data [k] is transmitted to the ED1, the second input data [k+1] is transmitted to the ED2, and the third input data [k+1] is transmitted to the ED3.

In the next step 1305, whether first determination flag=1 or not is determined. If not, the processing moves to step 1306. In step 1306, k=k+1 is defined. Then, the processing returns to step 1302. On the other hand, if first determination flag=1, the processing moves to step 1307 where whether second determination flag=1 or not is determined.

If not, the processing moves to step 1308. In step 1308, k=k+2 is defined. The processing then returns to step 1302. On the other hand, if second determination flag=1, whether k=N−2 or not is determined in step 1309. If k=N−2, because the final pixel has been processed in the ED3 in step 1304, the processing ends. If not, k=k+3 is defined in step 1310, and the processing returns to step 1302.

In step 1303, if k=N−1, the processing moves to step 1311.

In step 1311, the first input data [k=N] is transmitted to the ED1, and the second input data [k=N+1] is transmitted to the ED2. Next, in step 1312, whether first determination flag=1 or not is determined. If not, the processing moves to step 1306. If first determination flag=1, because the final pixel has been processed in the ED2 in step 1311, the processing ends.

If k=N in step 1302, the processing moves to step 1313 where the first input data [k=N] is transmitted to the ED1. After that, the processing ends.

Figure 15:
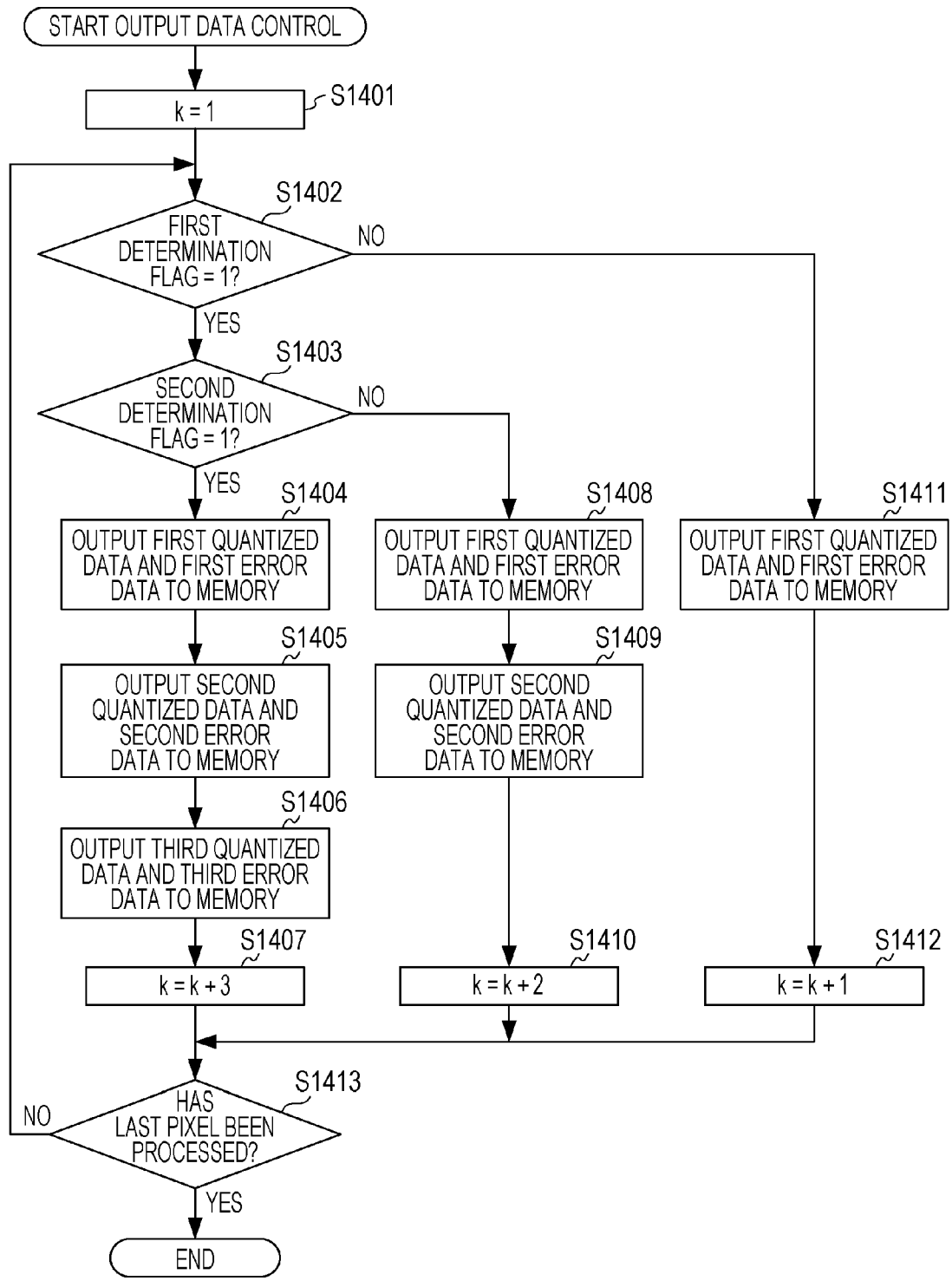
FIG. 15 illustrates a processing flow by an output data control unit according to the second embodiment.

With reference to FIG. 15, a processing routine of the output control unit 1240 will be described in detail. FIG. 15 illustrates a processing flow of the output control unit 1240. In this case, a pixel number is k, and a final pixel number is N.

Input data control starts in response to reception of data, and an initial value=1 is substituted into k in step 1401.

Next, in step 1402, whether first determination flag=1 or not is determined. If first determination flag=1, the processing moves to step 1403. In step 1403, whether second determination flag=1 or not is determined.

In step 1403, if second determination flag=1, the first quantized data and first error data are output to memory in step 1404. In step 1405, second quantized data and second error data are output to memory. In step 1406, third quantized data and third error data are output to memory. The processing moves to step 1407 where k=k+3 is defined and then moves to step 1413.

On the other hand, if second determination flag does not have 1 in step 1403, the processing moves to step 1408 where first quantized data and first error data are output to memory. In step 1409, second quantized data and second error data are output to memory. Then, the processing moves to step 1410. In step 1410, k=k+2 is defined. The processing moves to step 1413.

If first determination flag does not have 1 in step 1402, the processing moves to step 1411 where first quantized data and first error data are output to memory. In step 1412, k=k+1 is defined. The processing moves to step 1413.

In step 1413, whether the final pixel has been processed or not is determined. If the final pixel has not been processed, the processing returns to step 1402, and the operations are repeated. If the final pixel has been processed, the processing ends.

According to this embodiment, as described above, the first error diffusion unit 1210, the second error diffusion unit 1220, and the third error diffusion unit 1230 are caused to operate in parallel.

If determination flag=1 in the second quantization operating unit 1221, the second error diffusion unit 1220 may continue the error diffusion processing without adding error data on a same line. In other words, the second quantization operating unit 1221 may not be required to wait for error data on a same line.

If determination flag=1 for the second quantization operating unit 1221 and the determination flag=1 for the third quantization operating unit 1231, not only the second quantization operating unit 1221 but also the third quantization operating unit 1231 may continue the error diffusion processing without adding error data on a same line.

Therefore, the speed of the error diffusion processing may be increased by the amount equivalent to the number of determination of determination flag=1 for the second quantization operating unit 1221 and the number of determination of determination flag=1 for the second quantization operating unit 1221 and the number of determination of determination flag=1 for the third quantization operating unit 1231.

Thus, higher speed error diffusion processing than normal error diffusion processing may be achieved without compromising effects by an error diffusion method.

Other Embodiments

Having described embodiments above, fundamental configurations of the disclosure are not limited thereto.

For example, operating units such as a unit which multiplies error data by a diffusion coefficient, a unit which adds input data and error data, and a unit which adds sums of error data may be present in any of blocks above, and they are not limited to the configuration according to the first embodiment or second embodiment. The same effects may be achieved as those of the first embodiment and the second embodiment as far as similar processing to that of the embodiments above may be performed regardless of positions of the operating units. For example, having described according to the embodiments above that input image data and error data are added by an input control unit, the addition processing may not be performed by an input control unit. For example, in order to calculate error data to be diffused to a next line, addition processing may be performed by an output control unit. An operating unit which adds input image data and error data may be provided separately.

According to the first and second embodiments, a second quantization operating unit itself includes a unit which determines whether quantized data is fixed or not on the basis of a total of value calculated by a quantization operating unit in a second error diffusion unit. However, the configuration of the embodiments is not limited thereto. For example, a unit which determines whether quantized data is fixed or not on the basis of a total of value calculated by a quantization operating unit may be provided externally to a second error diffusion unit. A unit which determines whether quantized data is fixed or not on the basis of a total of value calculated by a quantization operating unit in a third error diffusion unit may also be provided externally to the third quantization operating unit.

Having described according to the embodiment that M-level image data is converted to bi-level data, M-level image data may be converted to N-level (M>N) image data, where N is equal to or higher than 3. In other words, the same is true for 3-level, 5-level, 9-level or other multi-level error diffusion methods. In a multi-level error diffusion, a plurality of threshold values are used while the possible range of an error value to be diffused to a left pixel may be smaller. Therefore, higher speed image processing by an error diffusion method may be achieved without indiscriminately reducing the speed of processes and compromising effects by the error diffusion method.

Having described according to the embodiments that whether quantized data is fixed or not is determined on the basis of a threshold value set in an error diffusion unit, a maximum value of possible values of error data to be diffused from pixel of interests on a same line and subject to error diffusion processing in parallel, and a minimum value of possible values of the error data, the configuration of the embodiment is not limited thereto. For example, a value acquired by adding a predetermined adjustment value to a maximum value of possible values of error data may be used instead of a maximum value of possible values of error data to be diffused from pixel of interests on a same line and subject to error diffusion processing in parallel. In the same manner, a value acquired by adding a predetermined adjustment value to a maximum value of possible values of error data may be used instead of a minimum value of possible values of error data to be diffused from pixel of interests on a same line and subject to error diffusion processing in parallel. For example, it may be set to determine to fix quantized data if 8-bit data is input which has a value of 0 to 255 and is equal to or higher than a set value of 179 acquired by adding a predetermined value (5) to a maximum value (−56) of possible values of error data to be diffused from a same line when a threshold value is equal to 128. For example, if it is equal to or lower than a set value of 77 acquired by adding a predetermined value (−5) to a maximum value (56) of possible values of error data to be diffused from a same line, it may be set to determine to fix quantized data.

The error diffusion method is not limited to Floyd & Steinberg method illustrated in FIG. 5, but any publicly known error matrix may be used.

Having described according to the embodiment that threshold values and diffusion coefficients are fixed value, a threshold value may be varied in accordance with an input value to an error diffusion unit, or a diffusion coefficient may be varied in accordance with an input value to an error diffusion unit. Alternatively, a random number may be added to an input value to an error diffusion unit. The variations in threshold value, variations in diffusion coefficient, and addition of a random number, for example, may contribute to improved image quality.

When a threshold value is varied in accordance with an input value to an error diffusion unit, a threshold value may be varied in accordance with a value input each of error diffusion units ED1 and ED2, for processing. The same processing as the processing in FIG. 7 is performed in the ED2 as follows: First, a threshold value in the ED1 is acquired by inputting a value of data input to a pixel to be processed in the ED1 to the ED2. From the threshold value, a maximum value and a minimum value of error data to be diffused to a right pixel by the ED1 may be acquired. By calculating a maximum value and a minimum value of possible values of error data to be diffused to a right pixel by the ED1 and input data of a pixel to be processed by the ED2 by the operation described with reference to FIG. 7, whether parallel processing with a previous pixel is possible or not may be determined. Also when three or more error diffusion units are provided, a maximum value and a minimum value of possible values of error data from a same line may be acquired and be used for the operation above. Therefore, the description will be omitted.

An error diffusion method is applied which processes one pixel in a plurality of clock, the ED2 may receive threshold value information from the ED1, instead of input of data from the ED1 to the ED2, the ED1 and the ED2 may perform parallel processing. When an ED3 is present, the ED3 may receive threshold value information from the ED2 so that the ED1, ED2, and ED3 may perform parallel processing. When four or more error diffusion units are provided, parallel processing may be achieved therebetween in the same manner. Therefore, the description will be omitted.

Processing of varying a threshold value in accordance with an input value to an error diffusion unit and processing of varying a diffusion coefficient may be performed simultaneously.

In processing of adding a random number to input data pixel by pixel, the random value may be a random value to be given to each pixel when input data is input to a control block or input data is input to an error diffusion unit. Adding this control may not prevent increases of speed.

According to the second embodiment, three error diffusion units are provided. In this application, one or more error diffusion unit may also be connected thereto. Also in the same manner, the Kth error diffusion unit (where K is a natural number of 4 or higher) performs error diffusion processing on a Kth pixel of interest (where K is a natural number of 4 or higher) on a same line as the first pixel of interest and after the second pixel of interest in parallel with the ED1, ED2, and ED3. In this case, whether quantized data on a Kth pixel of interest is fixed or not may be determined by error diffusion processing by the Kth error diffusion unit. More specifically, quantized data in the Kth pixel of interest is fixed or not may be determined on the basis of whether a sum of input image data of the Kth pixel of interest and error data diffused from a pixel excluding the first to (K−1)th pixels of interest is equal to or lower than a first reference value or not and is equal to or higher than a second reference value or not. The first reference value and second reference value may be different values from those in the ED2 and ED3.

Having illustrated only one direction of processing in FIG. 5, the opposite direction of processing may exist, and the direction of processing may alternately change.

All of the processing according to the embodiments above may not be performed by hardware, but a part of the processing may be performed by software.

An embodiment may provide an effect of achieving a higher speed image processing by an error diffusion method without compromising effects of the error diffusion method.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2012-128132 filed Jun. 5, 2012, which is hereby incorporated by reference herein in its entirety.

What is claimed is:

1. An image processing apparatus comprising:
   a first error diffusion unit which performs error diffusion processing on a predetermined first pixel of interest in image data;
   a second error diffusion unit which performs error diffusion processing on a second pixel of interest that is on a same line as that of the first pixel of interest and is next to the first pixel of interest, the second error diffusing unit comprising:
      an operating unit which calculates a total of values of input image data of the second pixel of interest and error data to be diffused from a pixel excluding the first pixel of interest, and
      a calculation unit which calculates quantized data and an error value; and
   a first determining unit which determines whether quantized data for the second pixel of interest is fixed by error diffusion processing by the second error diffusion unit or not, wherein
   the second error diffusion unit performs error diffusion processing in parallel with the first error diffusion unit,
   the calculation unit calculates the quantized data and the error value if the first determining unit determines that the quantized data is fixed, and
   the first determining unit determines whether the quantized data for the second pixel of interest is fixed by the second error diffusion unit or not on the basis of whether the total of value is equal to or lower than a first reference value or not and whether the total of value is equal to or higher than a second reference value that is higher than the first reference value or not.

2. The image processing apparatus according to claim 1, wherein
   the first reference value is a value acquired from a threshold value set in the second error diffusion unit and a maximum value of possible values of error data to be diffused from the first error diffusion unit; and
   the second reference value is a value acquired from a threshold value set in the second error diffusion unit and a minimum value of possible values of error data to be diffused from the first error diffusion unit.

3. The image processing apparatus according to claim 1, wherein
   if the first determining unit determines to fix quantized data, the first error diffusion unit performs at a next clock error diffusion processing on a next first pixel of interest that is a pixel on a same line as the second pixel of interest and is next to the second pixel of interest; and
   if the first determining unit determines not to fix quantized data, the first error diffusion unit performs at a next clock, error diffusion processing on a next first pixel of interest that is the second pixel of interest.

4. The image processing apparatus according to claim 1, further comprising a selecting unit which:
   if the first determining unit determines to fix quantized data, selects, at a next clock, a total of value of a value based on an error value calculated by the first error diffusion unit and a value based on an error value calculated by the second error diffusion unit at a current clock as error data to be diffused from a same line as the first pixel of interest for the first error diffusion unit; and
   if the first determining unit determines not to fix quantized data, selects at a next clock, a value based on an error value calculated by the first error diffusion unit at a current clock as error data to be diffused from a same line as the first pixel of interest for the first error diffusion unit.

5. The image processing apparatus according to claim 1, further comprising:
   a Kth error diffusion unit which performs error diffusion processing on Kth pixel of interest on a same line as the first pixel of interest and after the second pixel of interest (where K is a natural number of 3 or higher); and
   a (K-1)th determining unit which determines whether quantized data in the Kth pixel of interest by error diffusion processing by the Kth error diffusion unit is fixed or not,
   the Kth error diffusion unit having:
   an operating unit which performs error diffusion processing in parallel with the first error diffusion unit and calculates a total of value of input image data of the Kth pixel of interest and error data diffused from a pixel excluding the first to (K−1)th pixels of interest; and
   a calculating unit which calculates quantized data and error value and the Kth pixel of interest if the (K−1)th determining unit determines to fix the quantized data,
   wherein the (K−1) determining unit determines whether the Kth error diffusion unit fixes quantized data of the Kth pixel of interest or not on the basis of the total of value is equal to or lower than the first reference value or not and the total of value is equal to or higher than the second reference value or not.

6. An image processing method comprising:
   performing error diffusion processing on a predetermined first pixel of interest in image data by a first error diffusion unit in an integrated circuit, the image data being read from a memory;
   performing error diffusion processing on a second pixel of interest that is on a same line as that of the first pixel of interest and is next to the first pixel of interest by a second error diffusion unit in the integrated circuit; and
   determining whether quantized data for the second pixel of interest is fixed by error diffusion processing or not, wherein
   performing the error diffusion processing on the second pixel of interest comprises performing error diffusion processing in parallel with performing error diffusion processing on the predetermined first pixel of interest, and calculating a total of values of input image data of the second pixel of interest and error data to be diffused from a pixel excluding the first pixel of interest; and
   calculating quantized data and an error value if the quantized data for the second pixel of interest is determined to be fixed; and
   determining comprises determining whether the quantized data for the second pixel of interest is fixed or not on the basis of whether the total of value is equal to or lower than a first reference value or not and whether the total of value is equal to or higher than a second reference value that is higher than the first reference value or not.

* * * * *